United States Patent
Yanagidate

(10) Patent No.: US 8,860,830 B2
(45) Date of Patent: Oct. 14, 2014

(54) RECEPTION DEVICE WHICH ESTIMATES OPERATION TIMING OF THE IMAGING TIMING

(75) Inventor: Masaharu Yanagidate, Sagamihira (JP)

(73) Assignee: Olympus Corporation, Tokyo (JP)

( * ) Notice: Subject to any disclaimer, the term of this patent is extended or adjusted under 35 U.S.C. 154(b) by 233 days.

(21) Appl. No.: 13/469,455

(22) Filed: May 11, 2012

(65) Prior Publication Data

US 2012/0218430 A1 Aug. 30, 2012

Related U.S. Application Data

(63) Continuation of application No. PCT/JP2010/067754, filed on Oct. 8, 2010.

(30) Foreign Application Priority Data

Nov. 13, 2009 (JP) .................................. 2009-259752

(51) Int. Cl.

| | |
|---|---|
| H04N 5/232 | (2006.01) |
| H04N 5/44 | (2011.01) |
| H04L 7/00 | (2006.01) |
| H04L 7/04 | (2006.01) |
| H04N 21/43 | (2011.01) |
| H04N 21/443 | (2011.01) |
| H04N 21/2187 | (2011.01) |

(52) U.S. Cl.
CPC ......... *H04N 21/443* (2013.01); *H04N 21/4305* (2013.01); *H04N 21/2187* (2013.01)
USPC ...................... 348/211.1; 348/207.1; 348/725; 375/355; 375/362

(58) Field of Classification Search
USPC ........................ 348/207.1, 211.1, 725, 333.01; 375/354, 355, 362; 370/352, 395.64
See application file for complete search history.

(56) References Cited

U.S. PATENT DOCUMENTS 5,272,534 A * 12/1993 Vromans et al. ............... 348/725
7,489,362 B2 * 2/2009 Baer et al. ...................... 348/725

(Continued)

FOREIGN PATENT DOCUMENTS

| JP | 05-137088 A | 6/1993 |
|---|---|---|
| JP | 09-261241 A | 10/1997 |

(Continued)

OTHER PUBLICATIONS

International Search Report of PCT/JP2010/067754, mailing date of Nov. 2, 2010.
Extended European Search Report dated Jul. 14, 2014, issued in corresponding European Patent Application No. 10829798.7 (7 pages).

*Primary Examiner* — Nhan T Tran
(74) *Attorney, Agent, or Firm* — Westerman, Hattori, Daniels & Adrian, LLP

(57) ABSTRACT

A reception device includes: a reception unit which receives transmission data from an imaging device, the imaging device performing imaging processing at prescribed intervals, generating image data, packetizes the image data to create the transmission data, and transmitting the transmission data; a display processing unit which performs display processing of generating a display signal from the transmission data; a measurement unit which extracts a specific packet from the transmission data, measures a difference between prescribed reference timing generated at intervals in relation to display of the display signal and reception timing of the specific packet multiple times, and generates an estimated imaging timing signal in which operation timing of the imaging processing is estimated, based on the measurement result; and a processing unit which synchronizes the imaging processing and the display processing so as to be a prescribed phase with each other using the estimated imaging timing signal.

10 Claims, 20 Drawing Sheets

(56) References Cited

U.S. PATENT DOCUMENTS

| | | | |
|---|---|---|---|
| 8,300,709 B2 * | 10/2012 | Wakutsu | 375/240.28 |
| 2003/0120802 A1 | 6/2003 | Kohno | |
| 2004/0258047 A1 * | 12/2004 | Miao | 370/352 |
| 2007/0223391 A1 * | 9/2007 | Kuroki et al. | 370/392 |
| 2010/0061406 A1 * | 3/2010 | Tatsuta et al. | 370/503 |

FOREIGN PATENT DOCUMENTS

| | | | | |
|---|---|---|---|---|
| JP | 09261241 A | * | 10/1997 | H04L 12/28 |
| JP | 2002-101142 A | | 4/2002 | |
| JP | 2004-104701 A | | 4/2004 | |
| JP | 2004104701 A | * | 4/2004 | H04L 3/06 |

* cited by examiner

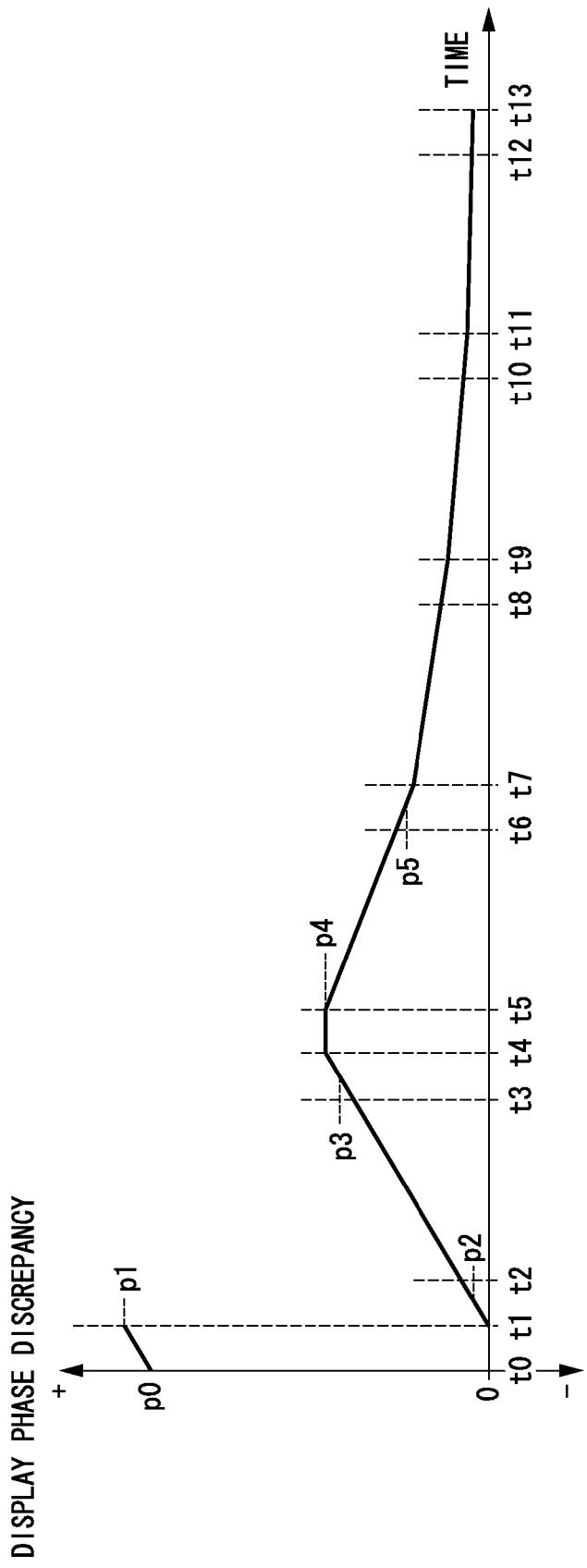

RECEPTION DEVICE WHICH ESTIMATES OPERATION TIMING OF THE IMAGING TIMING

BACKGROUND OF THE INVENTION

1. Field of the Invention

The present invention relates to a reception device that receives transmission data continuously transmitted from an imaging device at prescribed intervals, and performs imaging processing.

Priority is claimed on Japanese Patent Application No. 2009-259752, filed November 13, 2009, the contents of which are incorporated herein by reference.

2. Description of Related Art

In a case in which image data is radio transmitted as data packets, since the clocks on the transmission side and the reception side are different, overflow or underflow occurs on the reception side. To correct this, in Japanese Unexamined Patent Application, First Publication No. 2004-104701, transmission time information is created using a transmission clock, packetized with the image data, and transmitted to the network. Furthermore, on the reception side, the received packets are disassembled to extract the transmission time information and encoded data, and they are stored in a fluctuation absorption buffer, while the stored encoded data are read based on the transmission time information and a reference time, and decoded according to the reference time. Additionally, on the reception side, a relative delayed fluctuation time that the received packets have incurred is calculated based on the transmission time information and the reference time, and the reference time is adjusted according to a smoothed value of the relative delayed fluctuation time to each of the received packets.

SUMMARY OF THE INVENTION

A reception device of the present invention includes: a reception unit which receives transmission data from an imaging device, the imaging device performing imaging processing at prescribed intervals, generating image data for each frame or field, packetizes the image data to create the transmission data, and performing transmission processing of transmitting the transmission data; a display processing unit which performs display processing of generating a display signal for display from the transmission data; a measurement unit which extracts a specific packet from the transmission data, measures a difference between prescribed reference timing generated at intervals in relation to display of the display signal and reception timing of the specific packet multiple times, and generates an estimated imaging timing signal in which operation timing of the imaging processing is estimated, based on the measurement result; and a processing unit which performs phase adjustment processing of synchronizing the imaging processing and the display processing so as to be a prescribed phase with each other using the estimated imaging timing signal.

Moreover, in the reception device of the present invention, the processing unit may perform the phase adjustment processing such that display of the image data starts after a period during which the image data can be transmitted.

Furthermore, in the reception device of the present invention, the specific packet may include an identification signal, and the measuring unit may measure detection timing of the identification signal as the reception timing of the specific packet.

Moreover, in the reception device of the present invention, the specific packet may be a leading packet of each frame or field.

Furthermore, in the reception device of the present invention, the phase adjustment processing may include a first process of changing a phase of the display signal momentarily, and a second process of changing the phase of the display signal continuously by adjusting a frequency of a display clock used to generate the display signal, and the processing unit may perform the second process only after the first process is performed.

Moreover, in the reception device of the present invention, the phase adjustment processing may include a first process of setting a frequency of a display clock used to generate the display signal to a prescribed value including adjustment values corresponding to prescribed upper limit and lower limit frequencies, and a second process of setting the frequency of the display clock to an adjustment value such that a difference between a phase value of the display signal and the prescribed phase value becomes small, and the processing unit may perform the second process only after the first process is performed.

Furthermore, in the reception device of the present invention, the phase adjustment processing may be a process of changing a phase of the display signal momentarily, and the processing unit may perform the phase adjustment processing within a blanking period being a non-display period of the image data.

Furthermore, the reception device of the present invention may further include a storage unit which stores a plurality of algorithms associated with the measurement, the measurement unit may select a prescribed algorithm from the plurality of algorithms stored in the storage unit according to the result of measurement, and generate the estimated imaging timing signal using the prescribed algorithm.

Moreover, in the reception device of the present invention, the measurement unit may create a histogram by measuring the difference the multiple times, and generate the estimated imaging timing signal based on the histogram.

Furthermore, in the reception device of the present invention, the measurement unit may generate the estimated imaging timing signal based on the histogram of divided sections equal to or exceeding a predetermined threshold among each divided section of the histogram, as a result of measuring the difference the multiple times.

BRIEF DESCRIPTION OF THE DRAWINGS

FIG. 11 is a schematic diagram showing the change in display phase discrepancy according to the first embodiment of the present invention.

DETAILED DESCRIPTION OF THE INVENTION

Hereunder is a description of embodiments of the present invention, with reference to the drawings.

(First Embodiment)

Firstly, a first embodiment of the present invention will be described with reference to FIG. 1 to FIG. 11. The present embodiment is described using a case, as an example, in which the present embodiment is used for an imaging display system including an imaging device that captures images at a prescribed cycle period to create image data, creates transmission data including a plurality of packets from the image data, and transmits the transmission data by radio, and a reception device that receives the transmission data and generates a display signal. It is desirable that the imaging device and the reception device are connected one to one, or are connected via a small network.

Figure 1:
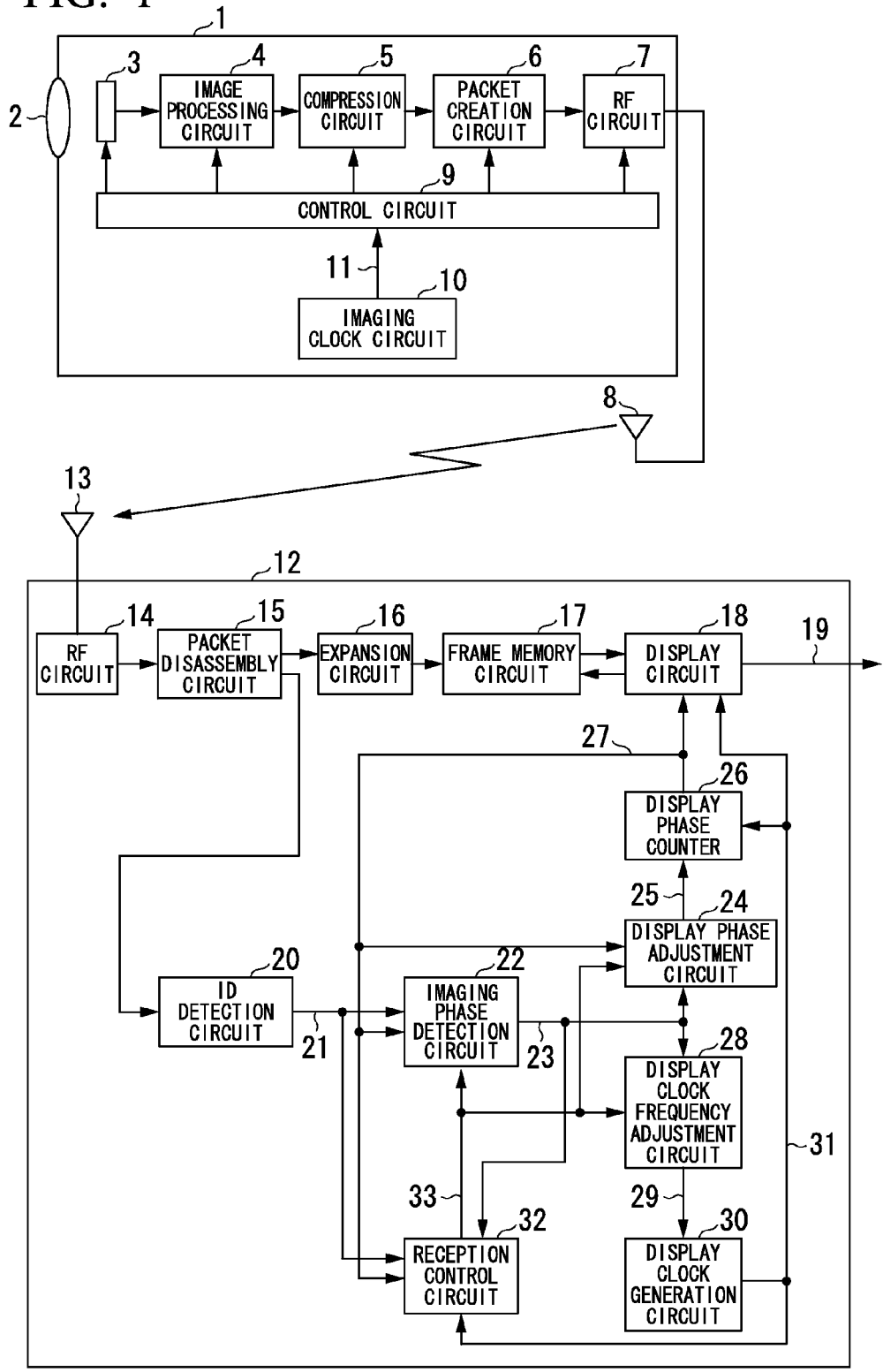
FIG. 1 is a block diagram showing the structure of an imaging display system according to a first embodiment of the present invention.

FIG. 1 shows the structure of the imaging display system according to the present embodiment. An imaging device 1 has an optical imaging system 2, an image sensor 3 (imaging element), an image processing circuit 4, a compression circuit 5, a packet creation circuit 6, an RF circuit 7, an antenna 8, a control circuit 9, and an imaging clock circuit 10.

The optical imaging system 2 forms an optical image of an object on the image sensor 3. The image sensor 3 converts the formed optical image into image data, and outputs it to the image processing circuit 4. The image sensor 3 of the present embodiment performs a progressive scan, and outputs image data for a frame in a prescribed period. In the following description, the phase of the image data output from the image sensor 3 is denoted as the imaging phase.

After the image data are image processed by the image processing circuit 4, they are converted into encoded data by the compression circuit 5, and added to the packet creation circuit 6. The packet creation circuit 6 combines the encoded data of every prescribed data value, adding widely recognized additional information containing ID information, being an identification signal for identifying packets, to create packets (transmission data).

The operations of the image sensor 3, the image processing circuit 4, the compression circuit 5, the packet creation circuit 6, and the RF circuit 7, are controlled by the control circuit 9. The operation of the control circuit 9 is referenced to the imaging clock 11 from the imaging clock circuit 10. Therefore, the imaging device 1 operates in synchronization with the imaging clock 11. Since the method by which image data is generated by the image sensor 3 up until the image data is packetized as described above is widely known, further description is omitted. The packet created by the packet creating circuit 6 is radio transmitted by the RF circuit 7 via the antenna 8.

A reception device 12 has an antenna 13, an RF circuit 14, a packet disassembly circuit 15, a expansion circuit 16, a frame memory circuit 17, a display circuit 18, an ID detection circuit 20, an imaging phase detection circuit 22, a display phase adjustment circuit 24, a display phase counter 26, a display clock frequency adjustment circuit 28, a display clock generation circuit 30, and a reception control circuit 32.

The RF circuit 14 receives a radio signal via the antenna 13, decodes the received radio signal, and outputs transmission data to the packet disassembly circuit 15. The packet disassembly circuit 15 disassembles the packets comprising the transmission data into encoded data and additional information, and outputs the encoded data to the expansion circuit 16 and the additional information to the ID detection circuit 20.

The expansion circuit 16 expands the encoded data to convert it into image data, and outputs it to the frame memory circuit 17. The image data is stored in the frame memory circuit 17. The image data stored in the frame memory circuit 17 is read by the display circuit 18 as required, converted (display processed) into a display signal 19 for the purpose of display, and output. The phase of the display signal 19 is determined by the value of a display count signal 27 added to the display circuit 18. The display count signal 27 is supplied from the display phase counter 26. Furthermore, the frequency of the display signal 19 is controlled by a display clock 31 added to the display circuit 18. The display clock 31 is supplied from the display clock generation circuit 30.

The ID detection circuit 20 detects ID information from the additional information in the leading packets of a frame, generates an ID detection signal 21 indicating the detection timing of the ID, and outputs the signal to the imaging phase detection circuit 22 and the reception control circuit 32. By measuring the reception timing of the leading packets using the display count signal 27 as a reference, the imaging phase detection circuit 22 generates an imaging phase detection signal 23 (estimated imaging timing signal) indicating the imaging timing of the imaging device 1 for output.

To be specific, by measuring (gauging) the ID detection signal 21 output from the ID detection circuit 20 multiple times using the display count signal 27 as a reference to create a histogram, and processing the histogram, the imaging phase detection circuit 22 removes fluctuation of the packet transmission timing to generate the imaging phase detection signal 23. Details of the imaging phase detection circuit 22 will be described later with reference to FIG. 3 to FIG. 7.

The imaging phase detection signal 23 is output to the display phase adjustment circuit 24, the display clock frequency adjustment circuit 28, and the reception control circuit 32. The display phase adjustment circuit 24 controls the display phase counter 26 by a reset signal 25, and adjusts the phase of the display signal 19. The display phase counter 26 generates a display count signal 27. The display clock frequency adjustment circuit 28 controls the display clock generation circuit 30 by a clock frequency control signal 29 to control the frequency of the display clock 31. The frequency control of the display clock 31 is also serves as the phase adjustment of the display signal 19. The display clock generation circuit 30 generates the display clock 31. The reception control circuit 32 outputs a control signal 33 which controls each unit of the reception device 12. The ID detection signal 21, the imaging phase detection signal 23, the display count signal 27, and the display clock 31 are supplied to the reception control circuit 32, and the control signal 33 is generated from those signals. The detail of the operation control of the reception device 12 by the reception control circuit 32 will be described later with reference to FIGS. 10A and 10B.

Next is a description of the operation modes of the reception device 12. There are three operation modes of the reception device 12: an initial phase adjustment mode immediately after the operation starts, an initial frequency adjustment mode performed successively to the initial phase adjustment mode, and a steady state display mode performed after the initial frequency adjustment mode.

The initial phase adjustment mode is a mode that performs processing in which the phase of the display signal 19 is adjusted by controlling the display phase counter 26 immediately after the reception device 12 starts reception. During the initial phase adjustment mode, the display signal 19 is a signal for displaying black data. The initial frequency adjustment mode is a mode that performs processing in which the frequency of the display clock 31 is adjusted by the display clock frequency adjustment circuit 28 to be in synchronization to the frequency of the imaging clock 11 after the completion of the initial phase adjustment mode. The steady state display mode is a mode that performs processing in which the frequency of the display clock 31 is adjusted by the display clock frequency adjustment circuit 28 after the completion of the initial frequency adjustment mode, so that the phase of the display signal 19 is adjusted to a prescribed phase with respect to the imaging phase.

Figure 2:
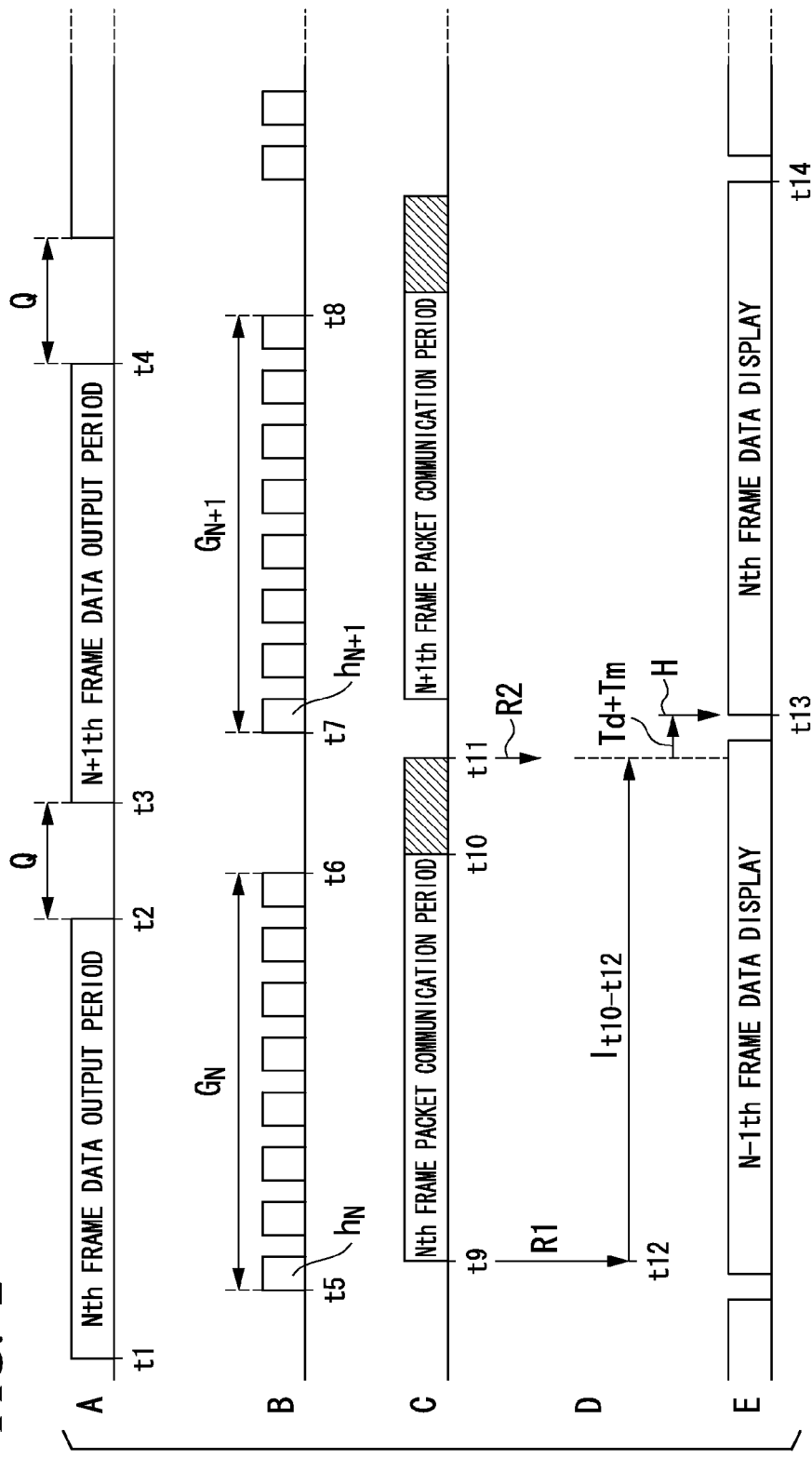
FIG. 2 is a timing chart to explain the relationship between imaging phase and display phase in a steady state display mode according to the first embodiment of the present invention.

FIG. 2 shows the relationship between the imaging phase of the imaging device 1 and the display phase of the reception device 12 in a steady state display mode. The first stage (top stage) A of FIG. 2 shows image sensor operation timing. The second stage B of FIG. 2 shows packet creation timing. The third stage C of FIG. 2 shows transmission timing. D of FIG. 2, which is between the third stage C and the fourth stage E, shows explanation of the imaging/reception timing. The fourth stage (bottom stage) E of FIG. 2 shows the display signal 19. As shown in the figure, the image sensor 3 repeats operations in which it outputs image data of the $N^{th}$ frame in the period of time t1-t2, leaving a blanking period (V blanking period) Q during time t2-t3, and outputs image data of the $N+1^{th}$ frame in the period of time t3-t4.

In this case, the period of time t1-t3 is one frame period, where time t1 is the start point of the imaging phase, and time t3 is the end point of the imaging phase. In the present embodiment, the imaging sensor 3 operates at 30 frames per second, and the period of time t1-t3 is 1/30 second (approximately 33.3 ms).

The period of time t5-t6 shows the packet creation period $G_N$ of the $N^{th}$ frame. The period of time t7-t8 shows the packet creation period $G_{N+1}$ of the $N+1^{th}$ frame. The leading packet in the packet creation period $G_N$ is frame leading packet $h_N$. The leading packet in the packet creation period $G_{N+1}$ is frame leading packet $h_{N+1}$. The creation packets in the packet creation circuit 6 starts at the point of time (time t5) that the image data is compressed, and data for one packet is prepared. In the compression processing of the present embodiment, since the processing time in the compression circuit 5 changes due to the pattern (frequency components in the captured image) of the image data, jitter occurs during the period of time t1-t5.

When the creation of packets is completed, transmission is performed in the order of the completed packets. Time t9 is the timing when the imaging device 1 starts transmitting the leading packet of the $N^{th}$ frame. Time t12 is the timing when the reception device 12 detects the ID of the leading packet. Arrow R1 indicates the delivery of the ID of the leading packet. Since the ID is added to the front of the packet, time t12 is immediately after time t9.

The period of time t1-t12 contains jitter accompanying communication (fluctuation of processing time of transmission processing, fluctuation of communication time by retransmission processing due to deterioration of the communication environment), in addition to the above-described jitter accompanying compression processing. The period of time t9-t10 is the communication period of the packets of the $N^{th}$ frame in the case where there is no retransmission processing. The period of time t9-t11 is the longest communication period that can be allowed in the case where there is retransmission processing. In the case where communication including retransmission processing is not completed at the point of time t11, communication of the packets of the $N^{th}$ frame is discontinued. Arrow R2 indicates the discontinuation of packet communication.

The reception device 12, as mentioned before, measures (gauges) the timing (timing at which the ID of the leading packet is detected) of time t12 of each of the frames multiple times to create a histogram, performs processing in which the histogram is used, and removes jitter elements accompanying the communication, which are contained in time t12, to estimate the operation timing of the imaging device 1, and estimate the point of time t11. When estimating the point of time t11, the reception device 12 detects time t12, and adds a prescribed time corresponding to the interval (prescribed value) $I_{t10-t12}$ of time t12-t11 to time t12 in order to estimate the point of time t11.

Furthermore, the reception device 12, as shown in the figure, adds a display processing time Td and margin time (prescribed time) Tm to the point of time t11 to create the point of time t13. Then, the reception device 12 adjusts the phase of the display signal 19 such that the image of the $N^{th}$ frame can be displayed from the point of time t13 (display signal leading phase H). The above-described display processing time Td is the time taken for the process of creating (packet disassembly, expansion, read/write frame memory, display signal creation) the display signal 19. Moreover, margin time Tm denotes the time due to adding the various jitter and measurement error.

In the case where, at time t11, the communication is cut off without being completed, the reception device 12 does not use image data of the $N^{th}$ frame in the display from time t13, but reuses the data of the previous frame (the N−1$^{th}$ frame). Detection of the communication being cut off is performed by the reception control circuit 32 detecting the ID detection signal 21, and controlling (control signal is not shown in the figure) the display circuit 18 using the detection result.

Figure 3:
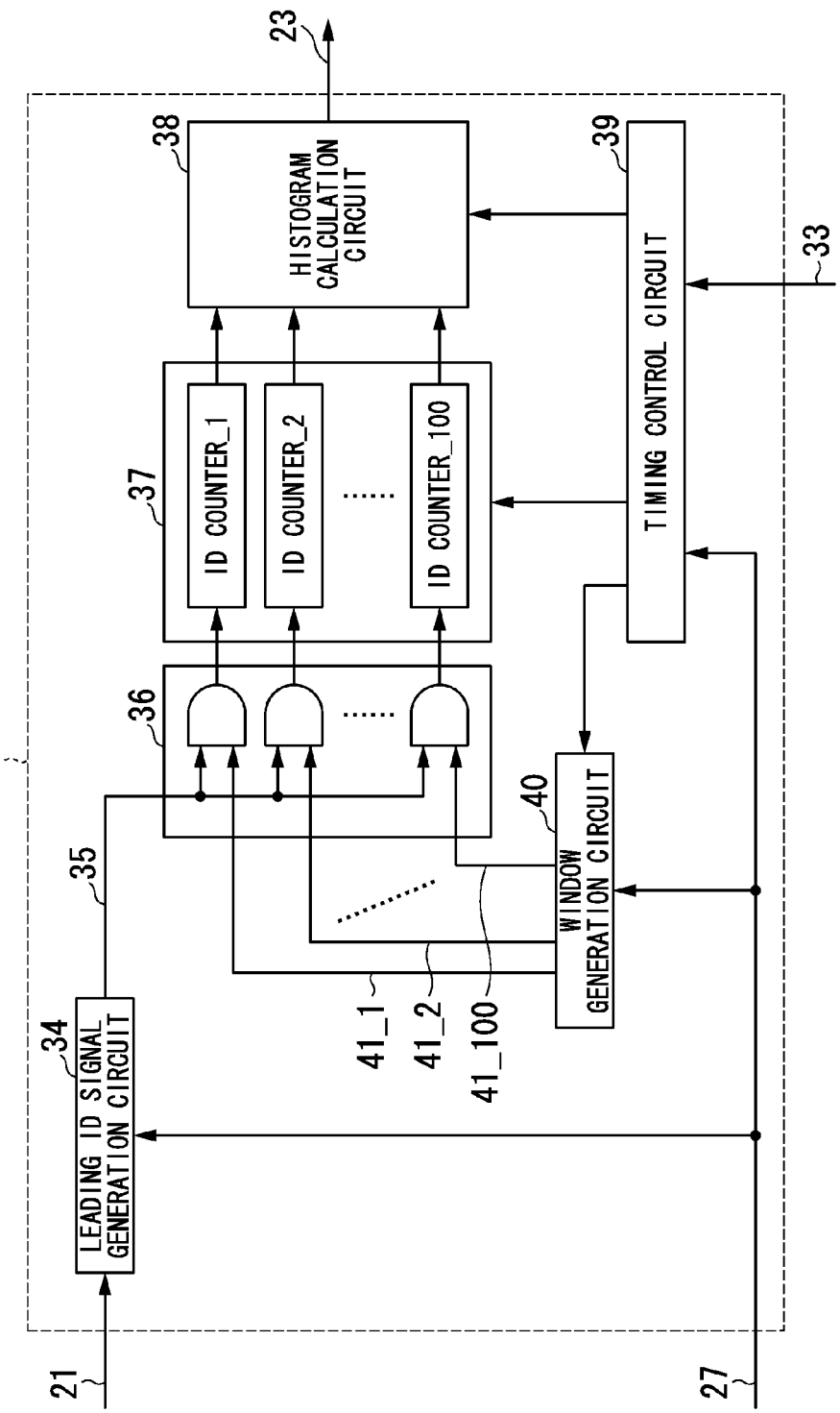
FIG. 3 is a block diagram showing the structure of an imaging phase detection circuit according to the first embodiment of the present invention.
Figure 4:
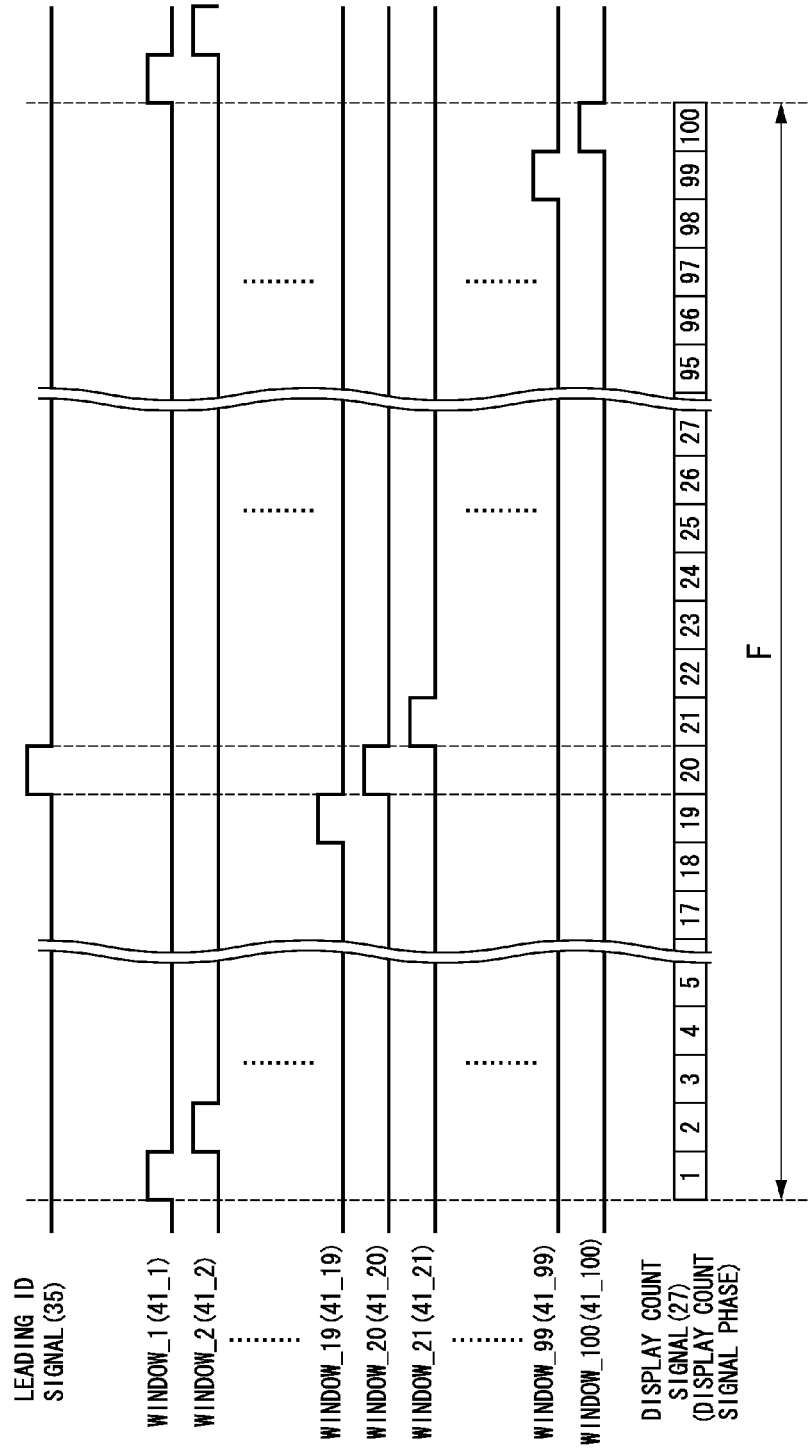
FIG. 4 is a timing chart showing the operation of the imaging phase detection circuit according to the first embodiment of the present invention.

Next is a description of the structure and operation of the imaging phase detection circuit 22 with reference to FIG. 3 and FIG. 4. FIG. 3 shows the structure of the imaging phase detection circuit 22. FIG. 4 shows the operation of the imaging phase detection circuit 22.

The imaging phase detection circuit 22 has a leading ID signal generation circuit 34, an AND gate block 36, an ID counter block 37, a histogram calculation circuit 38, a timing control circuit 39, and a window generation circuit 40.

The ID detection signal 21 and the display count signal 27 are input to the imaging phase detection circuit 22. The display count signal 27 is a signal indicating a count number in the display phase counter 26. As shown in FIG. 4, the display phase counter 26 counts to 100 in one frame period F. Since one frame in the present embodiment is 1/30 second, one count period is 1/3000 second (approximately 0.333 ms). The display count signal 27 is supplied to the leading ID signal generation circuit 34, the timing control circuit 39, and the window generation circuit 40. The ID detection signal 21 is supplied to the leading ID signal generation circuit 34.

The leading ID signal generation circuit 34 detects a leading ID in the ID detection signal 21, generates a leading ID signal 35 indicating the detection timing of the leading ID, and outputs it to the AND gate block 36. The leading ID signal 35 is a positive pulse signal that is generated in synchronization with the count of the display count signal 27. FIG. 4 shows the waveform of the leading ID signal 35.

The timing control circuit 39 generates a control signal for controlling the operation of each of the circuits in the imaging phase detection circuit 22 using the control signal 33 from the reception control circuit 32 and the display count signal 27. A window generation circuit 40 generates 100 window signals (window 41_1 to window 41_100), which become HI levels corresponding to the count value of the display count signal 27, and outputs them to the AND gate block 36. The following is a description where the count value of the display count signal 27 is written as a display count signal phase.

The AND gate block 36 detects at which phase of the display count signal 27 the pulse of the leading ID signal 35 occurs using the leading ID signal 35 and the window signals (41_1 to 41_100), and supplies count up signals to the counters (ID counter_1 to ID counter_100) corresponding to each of the phases. The AND gate block 36 has a structure in which a hundred 2-input AND gates are joined together. The leading ID signal 35 is input to the input on one side of each of the AND gates, and the window signal is input to the input on the other side. The outputs of the AND gates are supplied to the respective ID counter_1 to ID counter_100 of the ID counter block 37.

The ID counter block 37 is a circuit including a hundred pieces ID counter_1 to ID counter_100. The ID counter block 37 creates a histogram of the phases of the leading ID signal 35 by counting the number of occurrences of the leading ID signal for each count value (phase) of the display count signal 27. In the case of FIG. 4, the leading ID signal 35 becomes a HI level at the position where the display count signal phase=20. Furthermore, at the position where the display count signal phase=20, the window_20 becomes a HI level. As a result, the ID counter_20 is incremented. The outputs of each of ID counter_1 to ID counter_100 are supplied to the histogram calculation circuit 38. The histogram calculation circuit 38 performs calculation processing using histogram data from the ID counter block 37 according to the operation mode of the reception device 12 notified from the timing control circuit 39, and generates an imaging phase detection signal 23 indicating the transmission timing of the leading ID. The content of the calculation processing will be described later with reference to FIG. 5 to FIG. 7.

Figure 5:
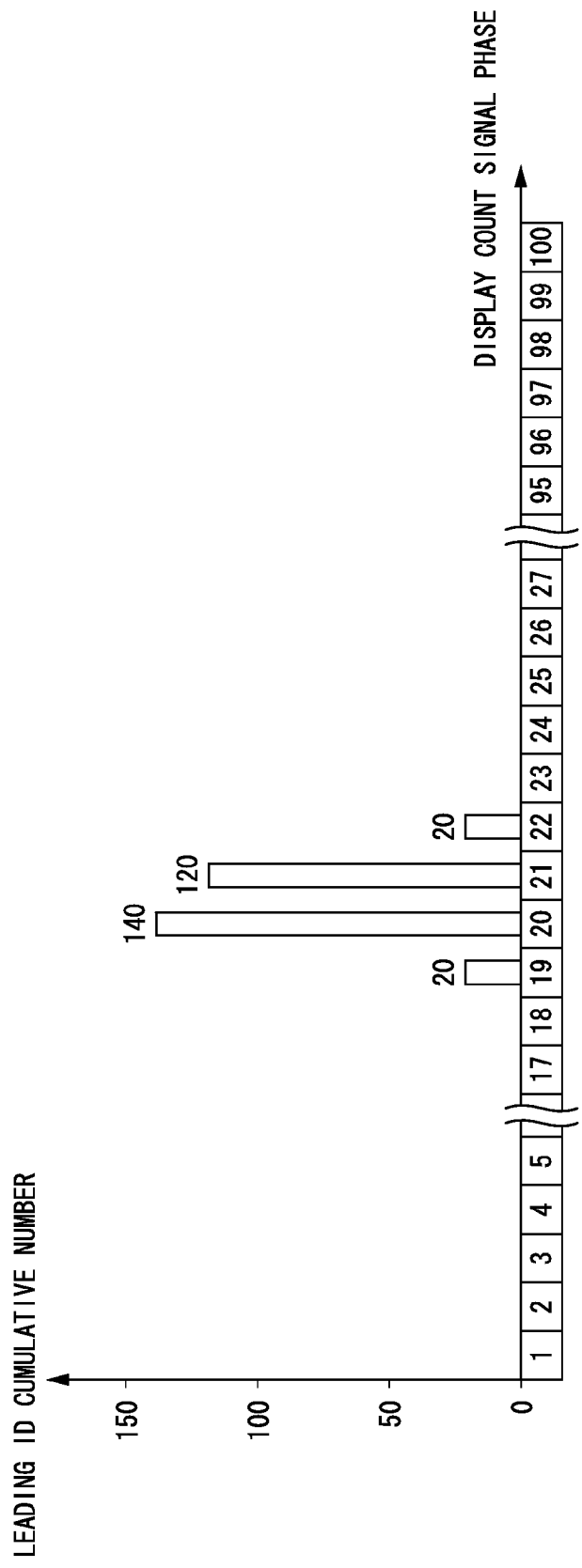
FIG. 5 is a reference diagram showing a histogram according to the first embodiment of the present invention.
Figure 6:
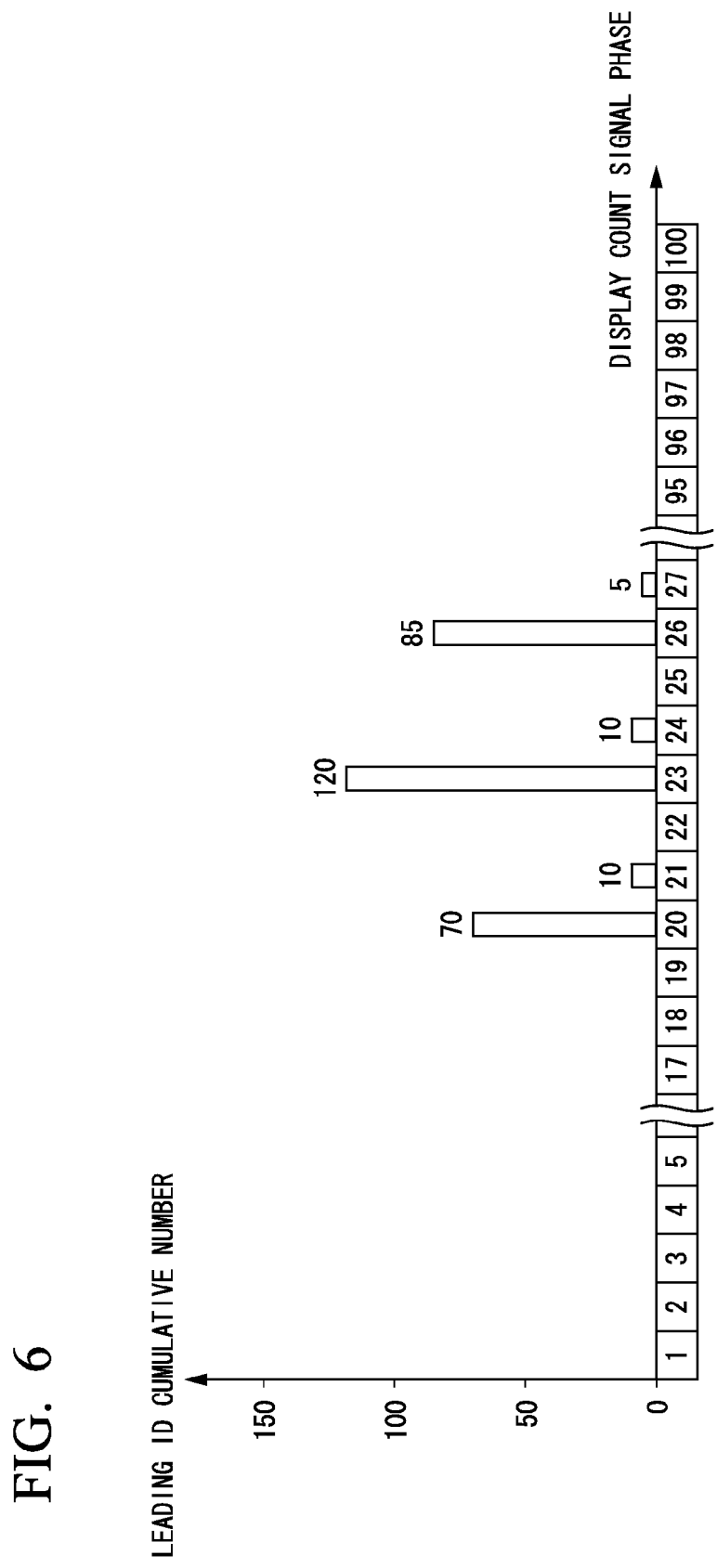
FIG. 6 is a reference diagram showing a histogram according to the first embodiment of the present invention.
Figure 7:
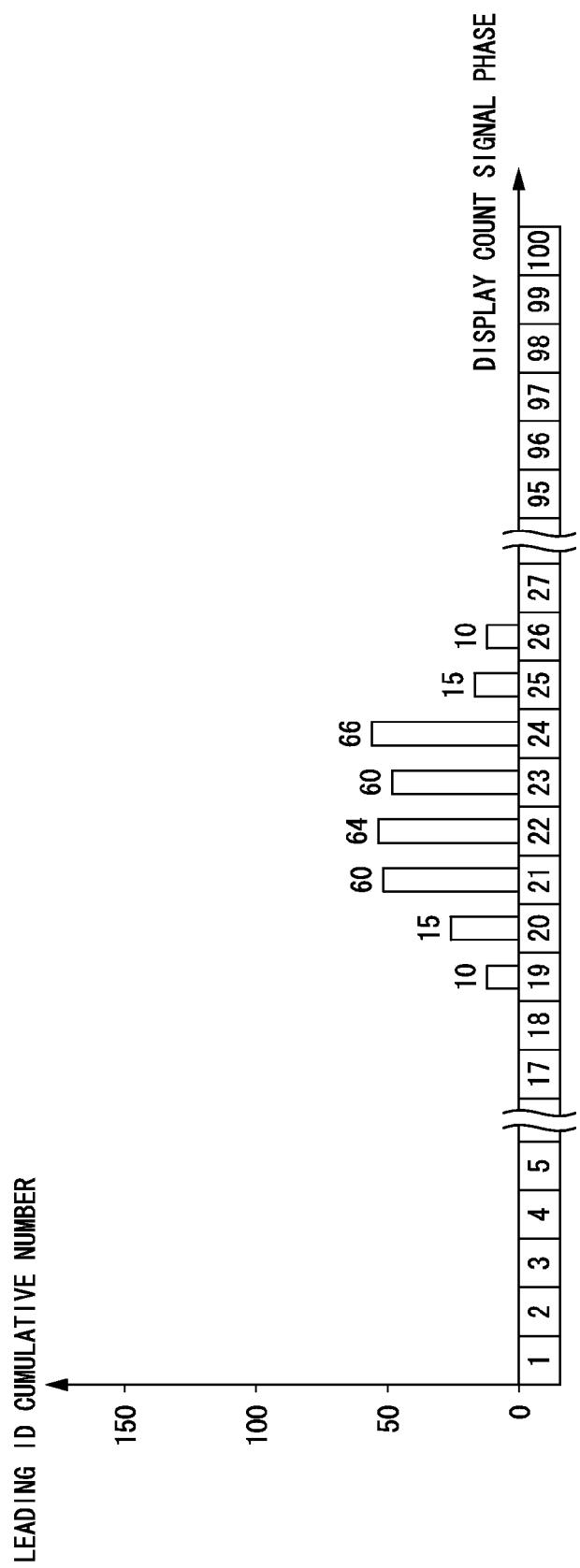
FIG. 7 is a reference diagram showing a histogram according to the first embodiment of the present invention.

Next is a description of a histogram in the present embodiment. FIG. 5 to FIG. 7 show examples of histograms. In the figures, the vertical axis indicates cumulative number of the leading ID (values of ID counter_1 to ID counter_100). The horizontal axis indicates the display count signal phase (count value of the display count signal 27). The present embodiment is described with a measurement period for creating the histogram of 10 seconds. Since the measurement period is 10 seconds, and the imaging period is 30 frames/second, the total number of leading ID signals detected is "300".

As described previously, the phase of the leading ID changes due to fluctuation of the compression processing time, fluctuation of the communication processing time, and fluctuation due to the frequency difference between the imaging clock frequency and the display clock frequency. The fluctuation of the compression processing time is fluctuation occurring due to the change in the content of the compression processing caused by the frequency elements contained in the captured image. The fluctuation band is a known value determined by the performance of the compression circuit 5. The fluctuation of the communication time includes fluctuation due to retransmission processing occurring due to deterioration of the data transmission path, and fluctuation of the processing time inside of the RF circuit 7. The retransmission processing interval and the fluctuation band of the processing time inside of the RF circuit 7 are known values determined by the RF circuit 7.

The above-described fluctuation of the compression processing time and fluctuation of the processing time inside of the RF circuit 7 are small values compared with fluctuation due to retransmission processing and fluctuation due to the frequency difference between the imaging clock frequency and the display clock frequency which will be described later. At the time of phase adjustment in the present embodiment, processing is performed in which the fluctuation bands of both fluctuations are added, and included in an adjustment margin.

Hereunder is a description of the influence on the histogram of retransmission processing. In the present embodiment, the retransmission processing interval is 1 ms. In this case, when a leading packet is retransmitted once, the reception timing of the packet shifts by three counts of the display count signal phase. For example, in the case where the leading ID is located at the display count signal phase '20', when the leading packet is retransmitted, the retransmitted leading packet is detected at the position of the display count signal phase '23'.

Next is a description of the influence on the histogram of the frequency difference between the imaging clock frequency and the display clock frequency. For example, in the case where the frequency difference between the imaging clock frequency and the display clock frequency is 60 ppm (60E-6), the timings of the image capture and the display shift by 0.6 ms during a 10 second measurement period. 0.6 ms is about two counts of the display count signal phase. Therefore, in the case where at the time of measurement beginning the leading ID is at the position of the display count signal phase '20', at the time of measurement completion the leading ID is at the position of the display count signal phase '22'. In the steady state display mode, since the frequency of the display clock 31 is adjusted to almost the same frequency as the frequency of the imaging clock 11, no discrepancy occurs in the display count signal phases due to the frequency difference between the imaging clock frequency and the display clock frequency.

FIG. 5 and FIG. 6 are examples of histograms in the steady state display mode. FIG. 5 shows a communication state in which there is little retransmission processing. FIG. 6 shows a communication state in which there is much retransmission processing. In FIG. 5, the cumulative numbers of the leading ID are distributed between the display count signal phases '19' and '22', with the majority distributed especially at the phases '20' and '21'. In FIG. 6, the majority of cumulative numbers of the leading ID are distributed at three count intervals, the display count signal phases '20', '23' and '26' corresponding to the occurrence of retransmission.

In the case of the steady state display mode, the method of detecting the phase value output as the imaging phase detection signal 23 varies according to the shape of the histogram. To be specific, the histogram calculation circuit 38 detects the frequency of retransmission occurrence from the distribution state in which the cumulative number of the leading ID in the histogram is greater than a reference number ("50" in the present description). In the case where the histogram calculation circuit 38 judges that retransmission occurrence is high, it outputs a display count signal phase with the smallest numeric value among the display count signal phases in which the cumulative number exceeds the reference number, as the imaging phase detection signal 23. On the other hand, in the case where the histogram calculation circuit 38 judges that retransmission occurrence is low, it outputs a display count signal phase with the largest cumulative number among the display count signal phases in which the cumulative number exceeds the reference number, as the imaging phase detection signal 23.

Retransmission occurrence is judged by the distribution of the display count signal phases in which the cumulative number is greater than or equal to the reference number. To be specific, the histogram calculation circuit 38 judges that retransmission occurrence is low in the case where the display count signal phases in which the cumulative number is greater or equal to the reference number are consecutive. On the other hand, the histogram calculation circuit 38 judges that retransmission occurrence is high in the case of dispersion by approximately three counts.

That is, in the case of FIG. 5, since the only display count signal phases in which the cumulative number is greater than or equal to the reference number (50) are '20' and '21', it is judged that retransmission occurrence is low. Therefore, the value of the imaging phase detection signal 23 is determined to be '20', which is the value of the display count signal phase in which the cumulative number is the greatest. On the other hand, in the case of FIG. 6, since the display count signal phases greater than or equal to the reference number are '20', '23' and '26', it is judged that retransmission occurrence is high. Therefore, the value of the imaging phase detection signal 23 is determined to be '20', which is the lowest value among the display count signal phases in which the cumulative number exceeds the reference number.

As described above, in the case of the steady state display mode, the histogram calculation circuit 38 detects the frequency of retransmission occurrence from the histogram showing the measurement results of the reception timing of the leading ID, selects an algorithm corresponding to the detected frequency from a plurality of algorithms, and determines a value of the imaging phase detection signal 23 according to the algorithm. The information of a plurality of available algorithms is stored in a memory (not shown in the figure).

FIG. 7 is a histogram in the initial phase adjustment mode or the initial frequency adjustment mode, and an example of a case where the frequency difference is great (approximately 60 ppm). Since frequency adjustment is not performed in the initial phase adjustment mode and the initial frequency adjustment mode, as mentioned previously, in the case where the frequency difference is approximately 60 ppm for example, the timings between the image capture and display shift by approximately two counts during a 10 second measurement period. Therefore, as shown in FIG. 7, the display count signal phases in which the cumulative number is greater than or equal to the reference number are consecutive, and the width of the consecutive band is determined according to the frequency difference.

In the initial phase adjustment mode and the initial frequency adjustment mode, in order to corresponding the above-described condition, the histogram calculation circuit 38 outputs the central value (the lower value in the case where it cannot be divided by '2') of the display count signal phases greater than or equal to the reference number, as the value of the imaging phase detection signal 23. In the case of FIG. 7, since the display count signal phases greater than or equal to the reference number are '21', '22', '23', and '24', the lower one '22' of the central values '22' and '23' is output as the imaging phase detection signal 23.

Figure 8:
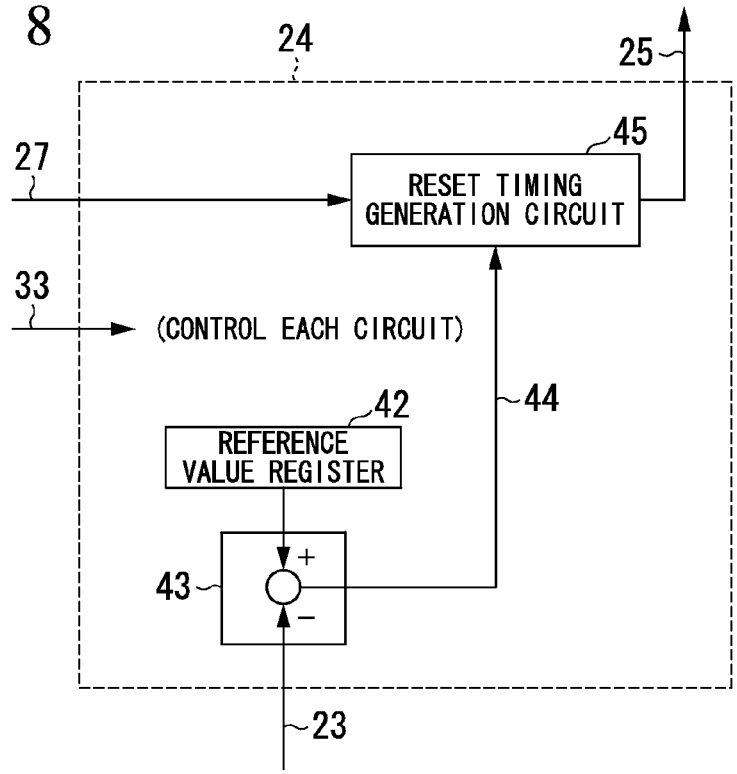
FIG. 8 is a block diagram showing the structure of a display phase adjustment circuit according to the first embodiment of the present invention.

Next is a description of the structure and operation of the display phase adjustment circuit 24 with reference to FIG. 8. FIG. 8 shows the structure of the display phase adjustment circuit 24. The display phase adjustment circuit 24 is a circuit that controls the display phase counter 26 in the initial phase adjustment mode, and adjusts the phase of the display signal 19 such that the phase of the display signal 19 becomes a prescribed phase with respect to the imaging phase. The display phase adjustment circuit 24 has a reference value register 42, a subtraction circuit 43, and a reset timing generation circuit 45.

The display count signal 27 from the display phase counter 26, the imaging phase detection signal 23 from the imaging phase detection circuit 22, and the control signal 33 from the reception control circuit 32 are supplied to the display phase adjustment circuit 24. The control of the display phase counter 26 by the display phase adjustment circuit 24 is performed only once immediately after the reception device 12 starts reception of the transmission signal from the imaging device 1.

The output value of the imaging phase detection signal 23 in the case where the phase of the display signal 19 is adjusted to a phase that is optimal (referred to hereunder as optimum phase) with respect to the imaging phase is stored in the reference register 42 in advance as a reference value. The subtraction circuit 43 subtracts the value of the imaging phase detection signal 23 from the value of the reference register 42. A subtraction output 44 from the subtraction circuit 43 is output to the reset timing generation circuit 45. The reset timing generation circuit 45 outputs a reset signal 25 to the display phase counter 26 only once at the point in time when the value of the display count signal 27 matches the value of the subtraction output 44, and resets the display phase counter 26.

Hereunder is a description with the case where the value stored in the reference register 42 is "20" as an example. In the case where the value of the imaging phase detection signal 23 is "60", the phase of the display signal 19 is 40 counts ahead of the optimum phase. In order to correct this, it is necessary to delay the display phase by 40 (=60−20).

The display phase adjustment circuit 24 delays the display phase by 40 counts by resetting the display phase counter 26 to "0" at the point in time when the display count reaches "40". That is, in the case where the value of the imaging phase detection signal 23 is "60", the subtraction output 44 becomes "40", and the reset timing generation circuit 45 outputs the reset signal 25 to the display phase counter 26 at the point in time when the display count signal 27 reaches "40", and sets the value of the display phase counter 26 to "0". By the above processing, the display signal 19 is adjusted to the optimum phase, and the initial phase adjustment mode is completed.

Figure 9:
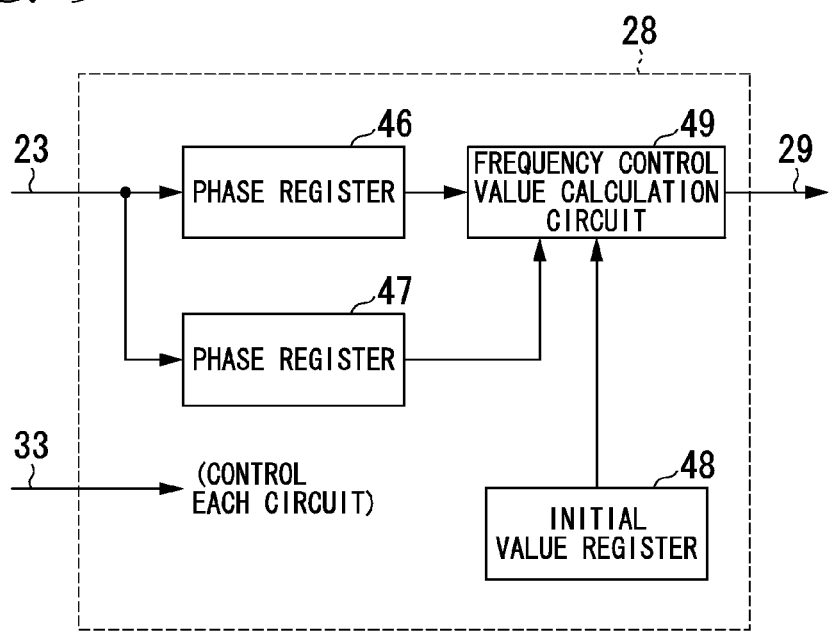
FIG. 9 is a block diagram showing the structure of a display clock frequency adjustment circuit according to the first embodiment of the present invention.

Next is a description of the structure and operation of the display clock frequency adjustment circuit 28 with reference to FIG. 9. FIG. 9 shows the structure of the display clock frequency adjustment circuit 28. The display clock frequency adjustment circuit 28 is a circuit that outputs the clock frequency control signal 29 which adjusts the clock frequency of the display clock 31. The display clock frequency adjustment circuit 28 has a phase register 46, a phase register 47, an initial value register 48, and a frequency control value calculation circuit 49.

The imaging phase detection signal 23 and the control signal 33 are supplied to the display clock frequency adjustment circuit 28. The imaging phase detection signal 23 is supplied to the phase register 46 and the phase register 47, and values are retained in each of the registers according to the instruction in the control signal 33. The values of the phase register 46 and the phase register 47 are output to the frequency control value calculation circuit 49.

The value of the initial value register 48 is also supplied to the frequency control value calculation circuit 49. The frequency control value calculation circuit 49 generates the clock frequency control signal 29 from the values of the phase register 46, the phase register 47, and the initial value register 48.

In the initial phase adjustment mode, the frequency control value calculation circuit 49 generates the clock frequency control signal 29 using the value of the initial value register 48. The initial value (central value in the frequency adjustment range) of the clock frequency of the display clock 31 is stored in the initial value register 48. In the initial frequency adjustment mode, the values of the imaging phase detection signal 23 measured at a prescribed measurement interval are stored in the phase register 46 and the phase register 47, and the frequency control value calculation circuit 49 generates the clock frequency control signal 29 using the difference in output values of the phase register 46 and the phase register 47. In the steady state display mode, after the value of the imaging phase detection signal 23 is stored in the phase register 46, the frequency control value calculation circuit 49 generates a clock frequency control signal 29 from the output value of the phase register 46, and the output value of the clock frequency control signal 29 at that point in time.

The following is a specific example of the operation in the initial frequency adjustment mode and the steady state display mode.

In the initial frequency adjustment mode, the sequence of 10 seconds measurement (storing values in the phase register 47)–50 seconds standby–10 seconds measurement (storing values in the phase register 46)–frequency adjustment, is performed once. In this case, the period from the central time of one measurement period to the central time of the next measurement period is 60 seconds. The frequency difference in the case where the value of the imaging phase detection signal 23 shifts by one count in the display count signal phase during the period of 60 seconds becomes approximately 5.56 ppm (1/(60×30×100)=5.555 ppm). For example, in the case where the difference in output values between the phase register 46 and the phase register 47 is 10 counts, the frequency control value calculation circuit 49 judges that the frequency difference is 55.6 ppm, and adjusts the output value of the clock frequency control signal 29 such that the output frequency of the display clock generation circuit 30 becomes 55.6 ppm lower. In the steady state display mode, the sequence of 10 seconds measurement (storing values in the phase register 46)–frequency adjustment–50 seconds standby, is performed repeatedly. In the steady state display mode, the frequency control value calculation circuit 49 adjusts the output value of the clock frequency control signal 29 such that it approaches the value of the imaging phase detection signal 23 in the case where the phase of the display signal 19 is the optimum phase with respect to the imaging phase of the imaging device 1.

To be specific, the frequency control value calculation circuit 49 obtains the value of the deviation of the measurement result with respect to the optimum phase, and controls such that the deviation value is halved at the next measurement. For example, in the case where the optimum phase is '20', and the measurement result is '28', the frequency control value calculation circuit 49 adjusts the frequency such that the next measurement result becomes '24'. In the case where there are 60 seconds before the next measurement, in order to shift the value of the imaging phase detection signal 23 by one count, the frequency of the display clock 31 may be shifted by approximately 5.56 ppm. In the case described above, since the measurement result is '28', and the target value of the next measurement is '24', the frequency control value calculation circuit 49 adjusts the output value of the clock frequency control signal 29 such that it becomes lower than the current frequency by 22.24 ppm, being four counts of the difference.

Figure 10A:
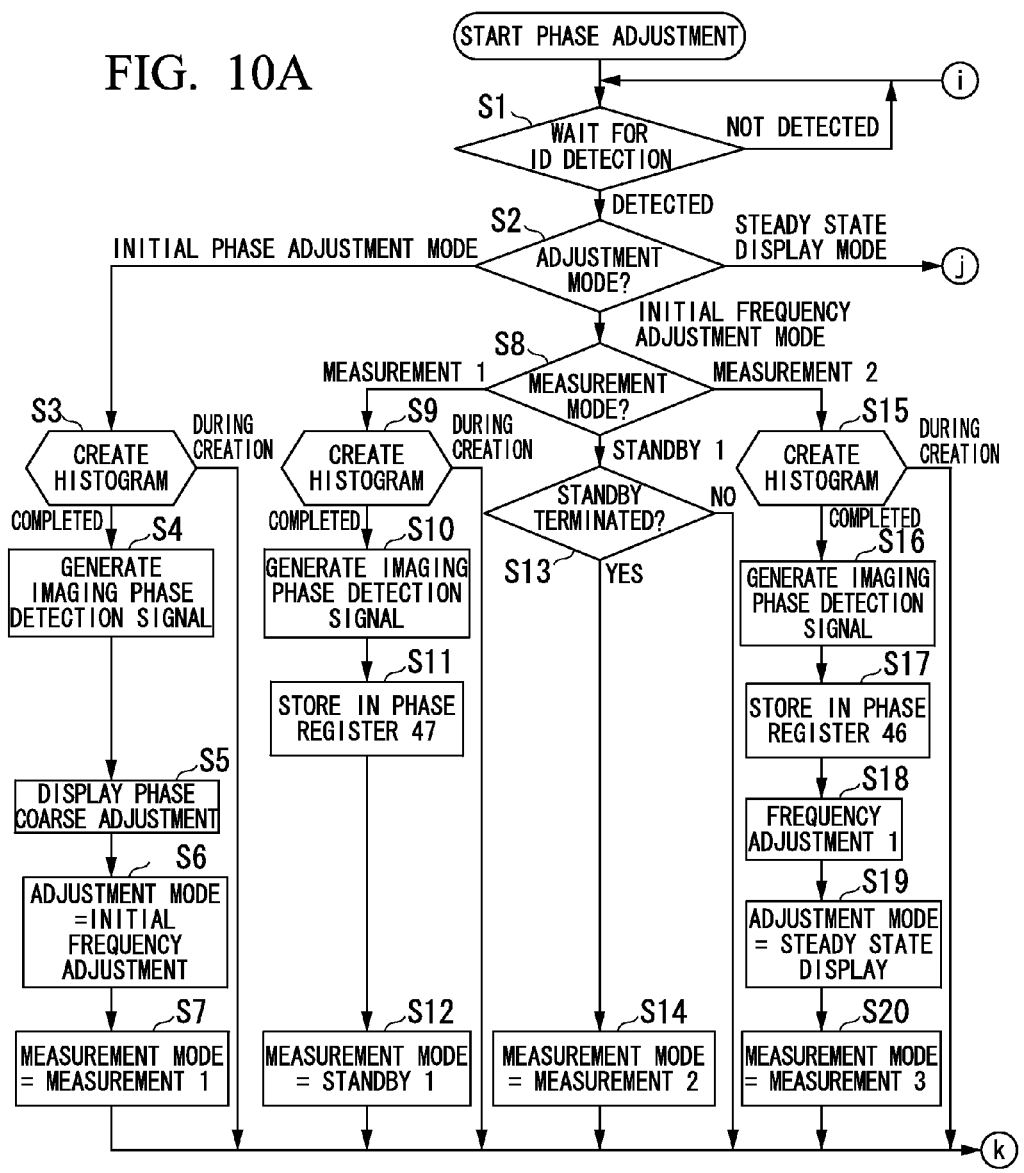
FIG. 10A is a flow chart showing the operation of a reception device according to the first embodiment of the present invention.
Figure 10B:
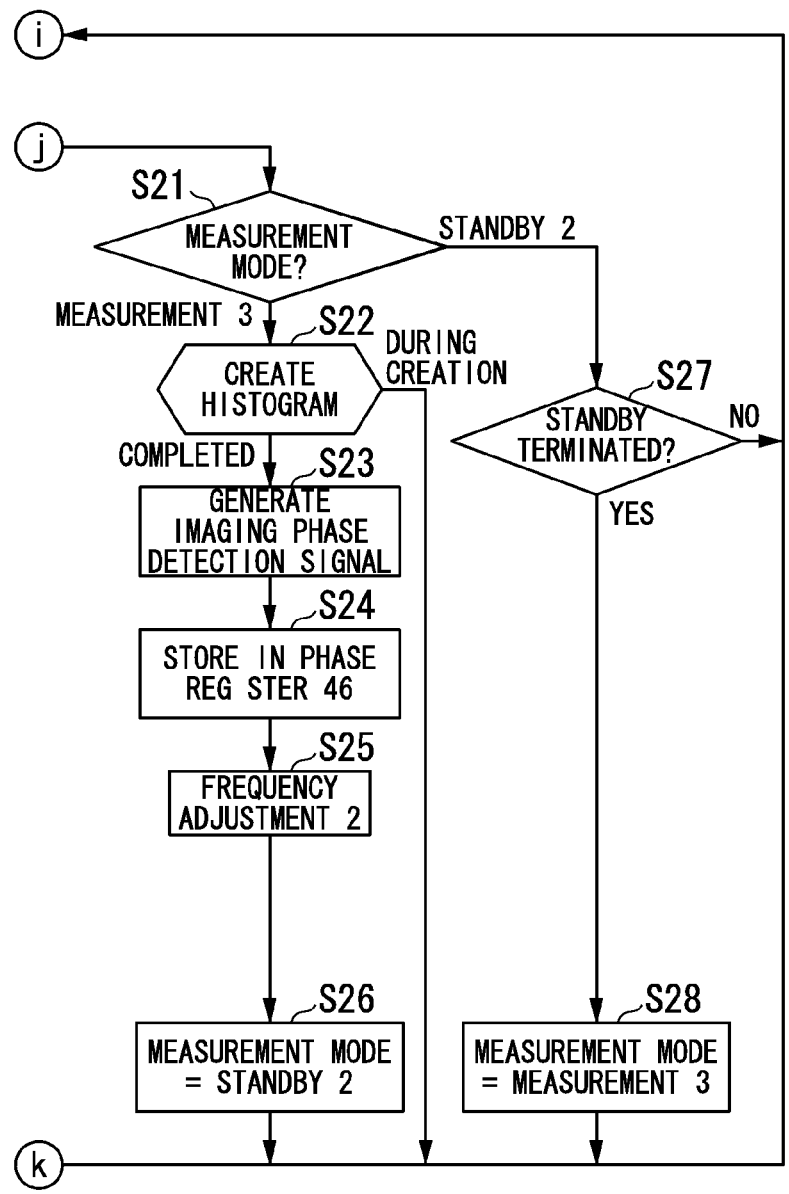
FIG. 10B is a flow chart showing the operation of the reception device according to the first embodiment of the present invention.

Next is a description of the phase adjustment operation from operation start in the reception device 12 with reference to FIGS. 10A, 10B, and 11. FIG. 10A and FIG. 10B show the phase adjustment operation in the reception device 12. FIG. 11 is a schematic diagram showing an example of the change in difference (referred to hereunder as display phase discrepancy) between the actual display phase and the prescribed optimum display phase from immediately after the operation starts.

Firstly, the initial phase adjustment mode will be described. At the start of the operation, the adjustment mode is the initial phase adjustment mode. As shown in FIGS. 10A and 10B, the ID detection circuit 20 waits for the leading ID to be detected (S1), and the reception control circuit 32 checks the adjustment mode after detecting the leading ID (S2). In the case where the adjustment mode is the initial phase adjustment mode, the reception control circuit 32 checks whether a histogram is being created (being measured) or not (S3). In the case where the measurements are completed, the imaging phase detection circuit 22 generates an imaging phase detection signal 23 according to the control signal 33 from the reception control circuit 32 (S4).

After generating the imaging phase detection signal 23, the display phase adjustment circuit 24 performs display phase adjustment according to the control signal 33 from the reception control circuit 32 (S5). Afterwards, the reception control circuit 32 sets the adjustment mode to the initial frequency adjustment mode (S6), sets the measurement mode to measurement 1 (S7), and completes the initial phase adjustment mode.

The above-described operation corresponds to the period of time t0-t1 of FIG. 11. In FIG. 11, p0 is the display phase discrepancy at the time of the start of the initial phase adjustment mode, and p1 is the display phase discrepancy at the completion of the initial phase adjustment mode. The difference between p0 and p1 is due to the frequency difference between the imaging clock and the display clock. In the initial phase adjustment mode, the frequency control value calculation circuit 49 generates the clock frequency control signal 29 between S2 and S3 using the initial value of the clock frequency stored in the initial value register 48.

Next is a description of the initial frequency adjustment mode. In the initial frequency adjustment mode, after detecting the leading ID, the adjustment mode is judged to be the initial frequency adjustment mode (S2). In the case of the initial frequency adjustment mode, the operation changes according to the measurement mode. The period during which measurement 1 is performed is the first phase measurement period. The period during which standby 1 is performed is a waiting period. The period during which measurement 2 is performed is the second phase measurement period. The reception control circuit 32 checks the measurement mode (S8).

In the first phase measurement, the reception control circuit 32 checks whether a histogram is being created (being measured) or not (S9). In the case where the measurements are completed, the imaging phase detection circuit 22 generates an imaging phase detection signal 23 according to the control signal 33 from the reception control circuit 32 (S10). The value of the imaging phase detection signal 23 is stored in the phase register 47 (S11). Afterwards, the reception control circuit 32 sets the measurement mode to standby 1 (S12), and completes the first measurement (S12).

Subsequently, the processing of standby 1 is performed, and the reception control circuit 32 checks whether the standby is completed or not until 50 seconds has elapsed (S13). After the 50 second standby is performed, the reception control circuit 32 sets the measurement mode to measurement 2 (S14), completes the processing of standby 1, and the processing shifts to the second phase measurement (measurement 2).

In measurement 2, the reception control circuit 32 checks whether a histogram is being created (being measured) or not (S15). In the case where the measurement is completed, the imaging phase detection circuit 22 generates an imaging phase detection signal 23 according to the control signal 33 from the reception control circuit 32 (S16). The value of the imaging phase detection signal 23 is stored in the phase register 46 (S17). Afterwards, the display clock frequency adjustment circuit 28 performs frequency adjustment 1 (S18). Since this frequency adjustment 1 (S18) is described in detail in the explanation of the operation of the frequency control value calculation circuit 49 in the initial frequency adjustment mode using FIG. 9, the description is omitted here. Afterwards, the reception control circuit 32 sets the adjustment mode to steady state display mode (S19), sets the measurement mode to measurement 3 (S20), and completes the initial frequency adjustment mode.

The operation of the initial frequency adjustment mode corresponds to the period of time t1-t4 of FIG. 11. The period of time t1-t2 is the first time phase measurement period, the period of time t2-t3 is the period of standby 1, and the period of time t3-t4 is the second time phase measurement period and the operating period of frequency adjustment processing (S18). The fact that the display phase discrepancy increases during the period of time t1-t4 is caused by the frequency adjustment having not been performed.

Finally, the steady state display mode will be described. In the steady state display mode, after detecting the leading ID, the adjustment mode is judged to be the steady state display mode (S2). Afterwards, the reception control circuit 32 checks the measurement mode (S21). The steady state display mode contains two measurement modes, being measurement 3 and standby 2. Measurement 3 measures the display phase discrepancy and adjusts the frequency, and standby 2 waits for the next measurement.

In measurement 3, the reception control circuit 32 checks whether a histogram is being created (being measured) or not (S22). In the case where the measurement is completed, the imaging phase detection circuit 22 generates an imaging phase detection signal 23 according to the control signal 33 from the reception control circuit 32 (S23). The value of the imaging phase detection signal 23 is stored in the phase register 46 (S24). Afterwards, the display clock frequency adjustment circuit 28 performs frequency adjustment 2 (S25). Since this frequency adjustment 2 (S25) is described in detail in the explanation of the operation of the frequency control value calculation circuit 49 in the steady state display mode using FIG. 9, the description is omitted here.

Subsequently, by the processing of standby 2 (S27, S28), 50-second standby processing is performed, and control it is shifted to measurement 3. In the steady state display mode, measurement 3 and standby 2 are performed repeatedly.

The operation of the steady state display mode corresponds to the period of time t4-t13 of FIG. 11. Measurement 3 is performed in the period of time t4-t5, and the output value of the clock frequency control signal 29 is adjusted such that the measured display phase discrepancy (p4) is halved (calculated with the measurement interval being 60 seconds) in the next measurement (time t6-t7). As a result, the display phase discrepancy (p5) in the next measurement (time t6-t7) becomes a half of p4. By performing measurement 3 and standby 2 repeatedly, the display phase discrepancy approaches zero.

As described above, according to the present embodiment, in the reception device 12, the reception timing of specific packets is measured multiple times, the imaging frequency is estimated using the measurement results, and the phase of the display signal 19 is adjusted based on the estimated imaging frequency. Therefore, it is possible to perform display processing in synchronization with the operation of the imaging device 1 such that overflow or underflow does not occur, and moreover it is possible to reduce the delay time of the display image.

Furthermore, by using specific packets, it is not necessary to add time information that causes an increase in the amount of data, so that it is possible to minimize the increase in the amount of transmission data. Especially, by measuring the reception timing of the ID for the purpose of packet identification when measuring the reception timing of the specific packets, the conventional packet structure does not need to be changed, so that it is possible to measure the reception timing without increasing the amount of transmission information.

Moreover, by estimating the time taken by retransmission processing, and adjusting the phase of the display signal 19 such that display of the image data starts from the timing (point of time t13 of FIG. 2) after the period during which the image data can be transmitted, optimum phase adjustment is possible even in a system that performs retransmission processing.

The phase adjustment processing of the present embodiment contains phase reset processing (S5) in which the phase of the display signal 19 is changed momentarily by the display phase adjustment circuit 24 resetting the phase counter 26, and phase continuous adjustment processing (S25) in which the display clock frequency adjustment circuit 28 adjusts the frequency of the display clock to be used to generate the display signal 19 to change the phase of the display signal 19 continuously. By performing the phase reset processing and the phase continuous adjustment processing together, phase adjustment of the display signal when reception starts can be performed at high speed and with high accuracy.

Furthermore, in the steady state display mode, by the histogram calculation circuit 38 determining the value of the imaging phase detection signal 23 according to the algorithm selected depending on the frequency of retransmission occurrence detected from the histogram, it is possible to generate an accurate imaging phase detection signal 23 corresponding to the discrepancy of the measurement result due to the occurrence of retransmission.

(Second Embodiment)

Next is a description of a second embodiment of the present invention with reference to FIG. 12 to FIG. 16. Between the present embodiment and the first embodiment, the output mode of the image data and the method of phase adjustment are different. The present embodiment is an example of the case where an image sensor 3 performs interlaced scanning In the case of interlaced scanning, one frame is comprised by two fields, being odd and even. Since interlaced scanning is well known, further description is omitted. The phase adjustment of the present embodiment is performed by only adjusting the frequency of a display clock signal.

Figure 12:
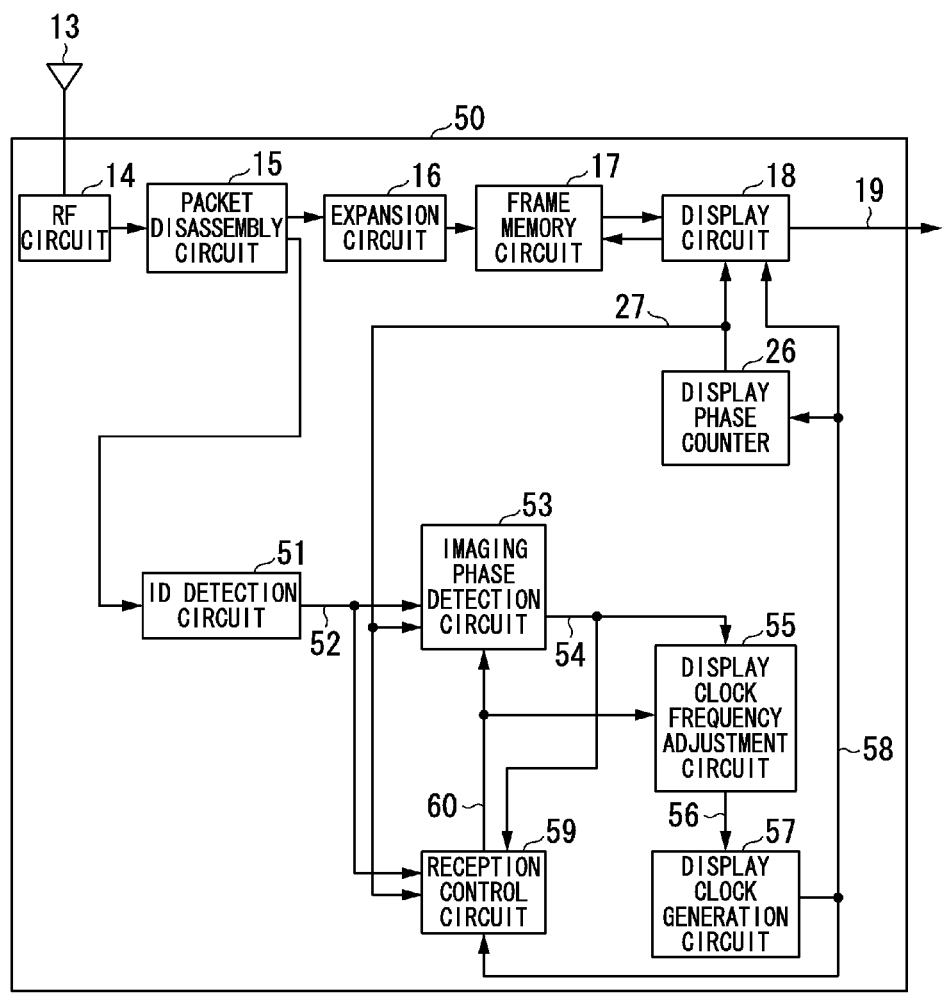
FIG. 12 is a block diagram showing the structure of a reception device according to a second embodiment of the present invention.

FIG. 12 shows the structure of a reception device 50 according to the present embodiment. In FIG. 12, the same numbers are used for the circuits with the same functions as those in the reception device 12 shown in FIG. 1, and different numbers from those of the circuits of the reception device 12 shown in FIG. 1 are used for circuits that are central to the operation of the present embodiment. The reception device 50 has an antenna 13, an RF circuit 14, a packet disassembly circuit 15, an expansion circuit 16, a frame memory circuit 17, a display circuit 18, a display phase counter 26, an ID detection circuit 51, an imaging phase detection circuit 53, a display clock frequency adjustment circuit 55, a display clock generation circuit 57, and a reception control circuit 59.

The ID detection circuit 51 detects ID information from the additional information in the leading packet of a field, generates an ID detection signal 52 indicating the detection timing of the ID, and outputs the signal to the imaging phase detection circuit 53 and the reception control circuit 59. By measuring (gauging) the reception timing of the leading packet using the display count signal 27 as a reference, the imaging phase detection circuit 53 generates and outputs an imaging phase detection signal 54 indicating the imaging timing of the imaging device 1.

The display clock frequency adjustment circuit 55 generates the clock frequency control signal 56 based on the imaging phase detection signal 54, and controls the frequency of the display clock 58 by controlling the display clock generation circuit 57 by the clock frequency control signal 56. The display clock generation circuit 57 generates the display clock 58. The reception control circuit 59 outputs a control signal 60 which controls the operations of each part of the reception device 50.

There are two operation modes of the reception device 50 of the present embodiment: an initial adjustment mode immediately after the operation starts, and a steady state display mode performed after the initial adjustment mode. The initial adjustment mode is a mode that measures display phase discrepancy, which is the difference between an actual display phase and an optimum display phase, and maintains the frequency of the display clock 58 at either the upper threshold frequency or the lower threshold frequency until the display phase discrepancy enters a prescribed tolerance range. When the display phase discrepancy enters the tolerance phase range, processing shifts to the steady state display mode with the frequency of the display clock 58 as a central value. The steady state display mode is a mode that, differently from the first embodiment, measures the display phase discrepancy continuously, and controls the frequency of the display clock 58 such that the display phase discrepancy becomes zero.

Figure 13:
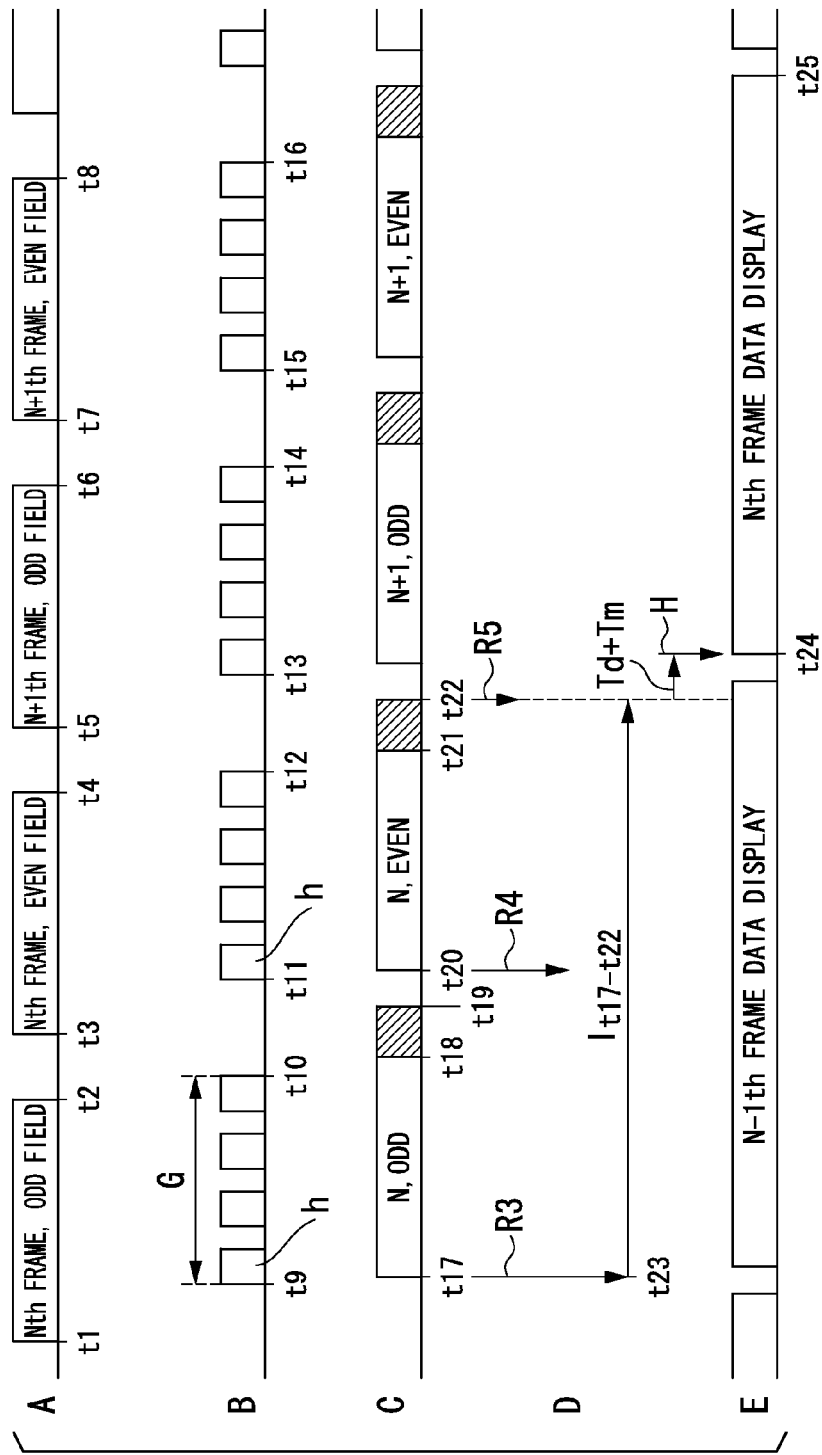
FIG. 13 is a timing chart to explain the relationship between imaging phase and display phase in a steady state display mode according to the second embodiment of the present invention.

Next is a description of the operation in the steady state display mode. FIG. 13 shows the relationship between the imaging phase of the imaging device 1 and the display phase of the reception device 50 in the steady state display mode in which the display phase and the imaging phase are synchronized. The first stage (top stage) A of FIG. 13 shows image sensor operation timing. The second stage B of FIG. 13 shows packet creation timing. The third stage C of FIG. 13 shows transmission timing. D between the third stage C and the fourth stage E explains the imaging/reception timing. The fourth stage (bottom stage) E of FIG. 13 shows the display signal.

As shown in FIG. 13, the image sensor 3 repeats an operation in which it outputs image data of the $N^{th}$ frame odd field in the period of time t1-t2, leaving a blanking period of time t2-t3, outputs image data of the $N^{th}$ frame even field in the period of time t3-t4, leaving a further blanking period of time t4-t5, outputs image data of the $N+1^{th}$ frame odd field in the period of time t5-t6, leaving a blanking period of time t6-t7, and outputs image data of the $N+1^{th}$ frame even field.

In this case, the period of time t1-t5 is one frame period, where time t1 is the start point of the imaging phase, and time t5 is the end point of the imaging phase. In the present embodiment, the image sensor 3 operates at 30 frames per second, and the period of one field (time t1-t3, time t3-t5) is 1/60 second (approximately 16.6 ms). The period of time t9-t10 indicates a packet creation period G. The leading packet in the packet creation period G is frame leading packet h. The creation of packets in the packet creation circuit 6 starts at the point of time (time t9) that the image data is compressed, and data for one packet is prepared.

When the packets have been created, transmission is performed in the order of the completed packets. Time t17 is the timing when the transmission of the leading packet of the $N^{th}$ frame starts. Arrow R3 indicates the delivery of the ID of the leading packet of the frame. Time t23 is the timing when the reception device 50 detects the ID of the leading packet. Since the ID is added to the front of the packet, it is detected immediately after time t17.

The period of time t1-t23 contains jitter accompanying communication (fluctuation of processing time of transmission processing, fluctuation of communication time by retransmission processing due to deterioration of the communication environment), other than the above-described jitter accompanying compression processing. The period of time t17-t18 is the communication period of the packet of the $N^{th}$ frame in the case where there is no retransmission processing. The period of time t17-t19 is the longest communication period that can be allowed in the case where there is retransmission processing. In the case where communication including retransmission processing is not completed at the point of time t19, communication of the packets of the $N^{th}$ frame odd field is discontinued.

The communication of the packets of the $N^{th}$ frame even field is performed in the period of time t20-t22. The leading packet of the field is output at the point of time t20 which is 1/60 second delayed from time t17. Arrow R4 indicates the delivery of the ID of the leading packet of the field. In the present embodiment, the ID detection timing of the leading packet of the even field is also used to generate the imaging phase detection signal 23. To be specific, a histogram is created using the timing in which the phase corresponding to 1/60 second is corrected with respect to the ID detection timing of the leading packet of the even field together with the detection timing of the ID (ID detection timing of the leading packet of the odd field) of the frame leading packet. Arrow R5 indicates the discontinuation of packet communication of the N$^{th}$ frame even field.

Figure 14:
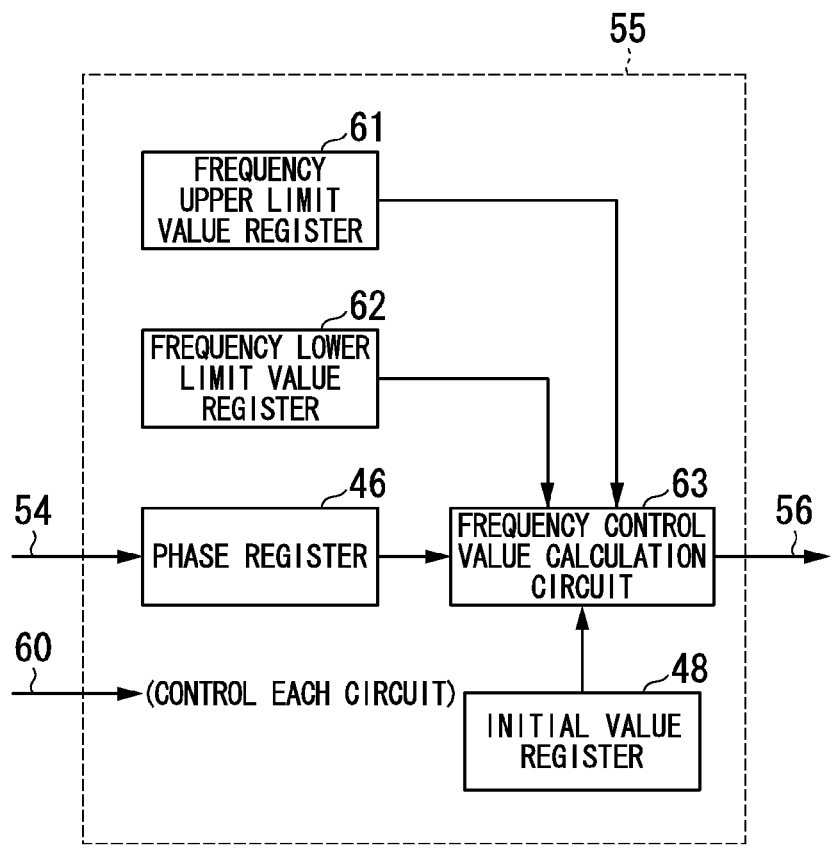
FIG. 14 is a block diagram showing the structure of a display clock frequency adjustment unit according to the second embodiment of the present invention.

Next is a description of the structure and operation of the display clock frequency adjustment circuit 55 with reference to FIG. 14. FIG. 14 shows the structure of the display clock frequency adjustment circuit 55. In the present embodiment, phase adjustment of the display signal 19 is all performed by frequency adjustment of the display clock 58. The display clock frequency adjustment circuit 55 controls the frequency of the display clock 58. As shown in FIG. 14, the display clock frequency adjustment circuit 55 has a phase register 46, an initial value register 48, a frequency upper limit value register 61, a frequency lower limit value register 62, and a frequency control value calculation circuit 63.

The frequency upper limit value register 61, the frequency lower limit value register 62, and the initial value register 48 are used to adjust the phase of the display signal 19 in the initial adjustment mode. The upper limit value in a prescribed frequency range is stored in the frequency upper limit value register 61. The lower limit value in a prescribed frequency range is stored in the frequency lower limit value register 62. The central value in a prescribed frequency adjustment range is stored in the initial value register 48. The frequency control value calculation circuit 63 generates a clock frequency control signal 56 from the values of the phase register 46, the initial value register 48, the frequency upper limit value register 61, and the frequency lower limit value register 62.

Figure 15:
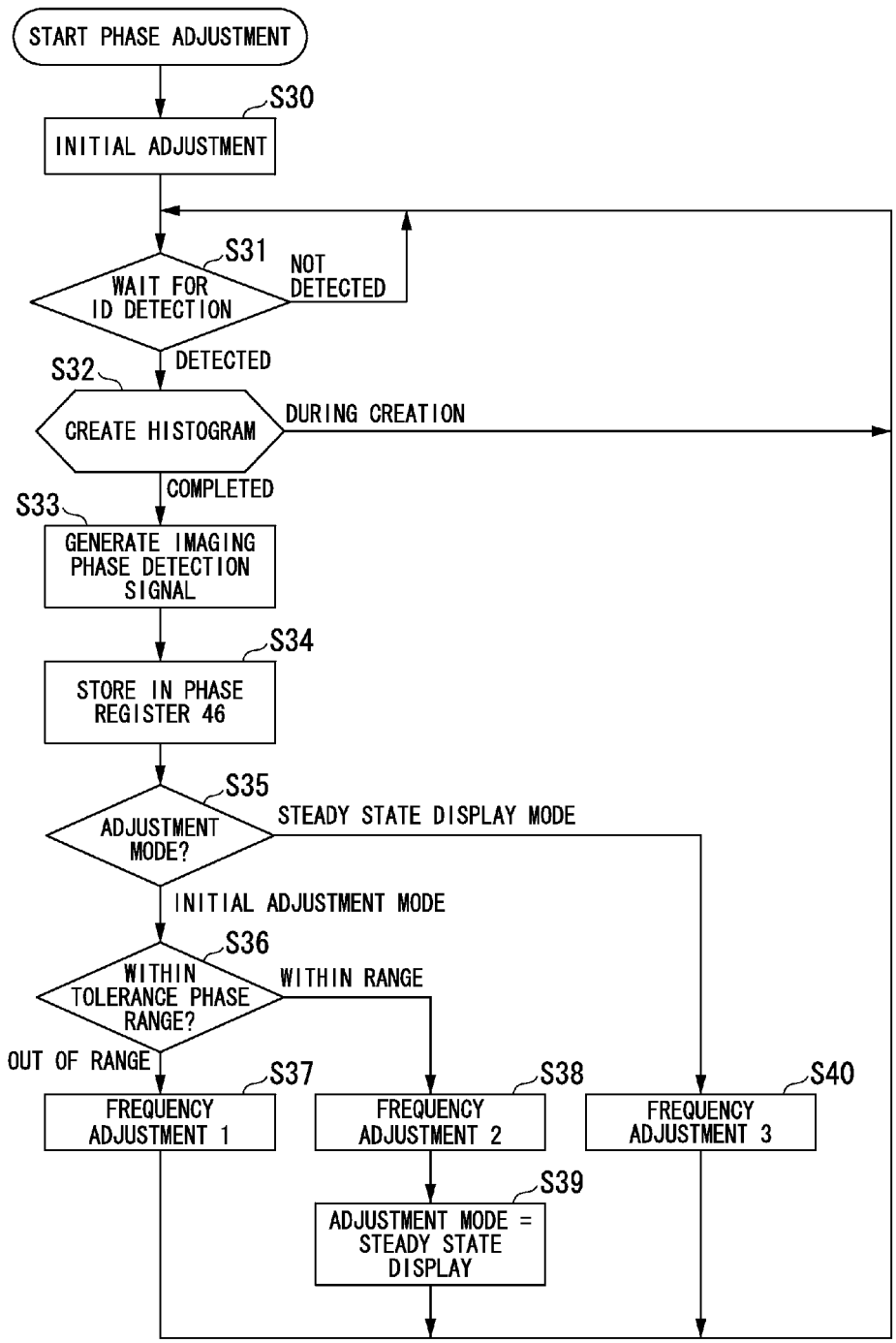
FIG. 15 is a flow chart showing the operation of the reception device according to the second embodiment of the present invention.
Figure 16:
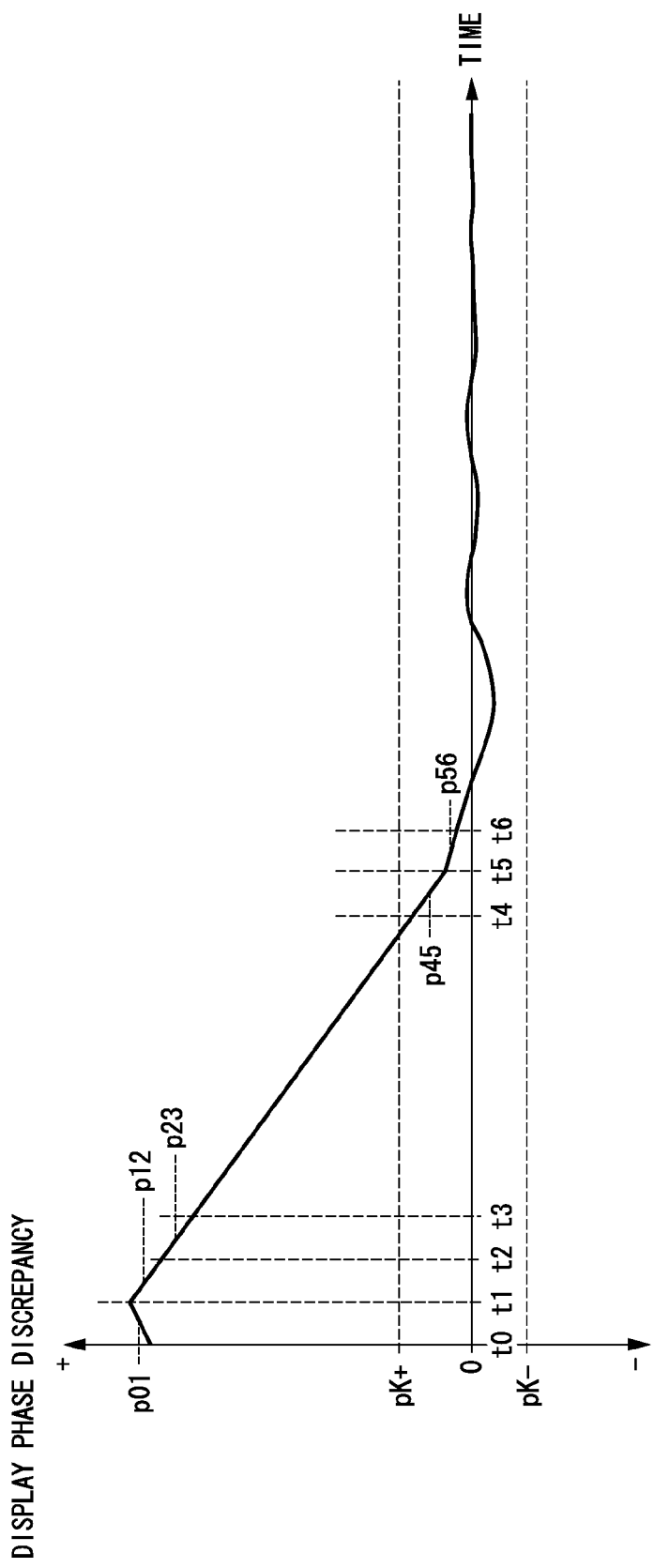
FIG. 16 is a schematic diagram showing the change in display phase discrepancy according to the second embodiment of the present invention.

Next is a description of the phase adjustment operation from the start of the operation in the reception device 50 with reference to FIG. 15 and FIG. 16. FIG. 15 shows the phase adjustment operation in the reception device 50. FIG. 16 is a schematic diagram showing an example of the change in difference (display phase discrepancy) between the actual display phase and an optimum display phase immediately after the operation starts.

Firstly, the operation in the initial adjustment mode will be described. The adjustment mode is the initial adjustment mode immediately after the operation starts. As shown in FIG. 15, when the phase adjustment operation starts in the reception device 50, initial adjustment (S30) is performed. In the initial adjustment (S30), the reception control circuit 59 sets the adjustment mode to the initial adjustment mode, and the display clock frequency adjustment circuit 55 sets the display clock frequency to the central value using the value of the initial value register 48.

The ID detection circuit 51 waits for the leading ID to be detected (S31), and the reception control circuit 59 checks whether a histogram is being created (being measured) or not (S32). In the case where the measurements are completed, the imaging phase detection circuit 53 generates an imaging phase detection signal 54 according to the control signal 60 from the reception control circuit 59 (S33). The value of the imaging phase detection signal 54 is stored in the phase register 46 of the display clock frequency adjustment circuit 55 (S34). The operation from immediately after the operation starts to this point corresponds to the period of time t0-t1 of FIG. 16.

Subsequently, the reception control circuit 59 checks the measurement mode (S35). In the case where the measurement mode is the initial adjustment mode, the reception control circuit 59 determines whether the display phase discrepancy is within the tolerance phase range or not (S36). If the display phase discrepancy is out of the tolerance phase range, the display clock frequency adjustment circuit 55 performs frequency adjustment 1 (S37) according to the control signal 60 from the reception control circuit 59.

In frequency adjustment 1 (S37), the frequency control value calculation circuit 63 of the display clock frequency adjustment circuit 55 selects either the frequency upper limit value register 61 or the frequency lower limit value register 62 depending on the display phase discrepancy, which corresponds to the value stored in the phase register 46. Furthermore, in frequency adjustment 1 (S37), the clock frequency control signal 56 corresponding to the value stored in the selected register is generated and output. The range pK+ to pK− of FIG. 16 is the tolerance phase range. In the case where the display phase discrepancy exceeds pK+, the frequency upper limit value register 61 is selected. In the case where the display phase discrepancy is less than pK−, the frequency lower limit value register 62 is selected.

On the other hand, if the display phase discrepancy is within the tolerance phase range, the frequency control value calculation circuit 63 of the display clock frequency adjustment circuit 55 performs frequency adjustment 2 (S38) according to the control signal 60 from the reception control circuit 59. In frequency adjustment 2 (S38), the frequency control value calculation circuit 63 makes the value stored in the initial value register 48 the control value, rather than those in the frequency upper limit value register 61 or the frequency lower limit value register 62. Afterwards, the reception control circuit 59 sets the adjustment mode to the steady state display mode (S39).

In the case of FIG. 16, since the detection result (p01) in the first imaging phase detection operation period (time t0-t1) is out of the tolerance range (over the upper limit), in frequency adjustment 1 (S37), the value of the frequency upper limit value register 61 is selected to generate the value of the clock frequency control signal 56. In the example shown in FIG. 16, the detected display phase discrepancy enters the phase tolerance range at the point of time indicated by time t4-t5. At time t0-t5, the adjustment mode is the initial adjustment mode. After time t5, the adjustment mode is the steady state display mode.

Next is a description of the steady state display mode. In the steady state display mode of the present embodiment, differently from the first embodiment, standby processing is not performed, but the measurement (frequency adjustment) processing is performed continuously. In the steady state display mode, similar to the initial adjustment mode, the processing from the leading ID detection standby (S31) to storage of the value in the phase register 46 (S34) is performed sequentially. Afterwards, the reception control circuit 59 checks the adjustment mode (S35). Since the adjustment mode is the steady state display mode, the display clock frequency adjustment circuit 55 performs frequency adjustment 3 (S40) according to the control signal 60 from the reception control circuit 59.

In frequency adjustment 3 (S40), the frequency control value calculation circuit 63 of the display clock frequency adjustment circuit 55 adjusts the clock frequency control signal 56 using the current frequency control value and the detected display phase discrepancy such that the display phase discrepancy is reduced. Since the detail of the adjustment to reduce the display phase discrepancy is well known as a positioning control theory, the description is omitted here.

As mentioned above, according to the present embodiment, in the reception device 50, by measuring the reception timing of specific packets multiple times, estimating the imaging frequency using the measured results, and adjusting the frequency of the display clock 58 based on the estimated imaging frequency, the phase of the display signal 19 is adjusted. Therefore, it is possible to perform display processing in synchronization with the operation of the imaging device 1 such that overflow or underflow does not occur, and furthermore it is possible to reduce the delay time of the display image. Moreover, since it is possible to adjust the phase of the display signal 19 by only adjusting the frequency of the display clock 58, it is possible to minimize an increase in hardware.

The phase adjustment processing of the present embodiment contains coarse adjustment processing (processing in the initial adjustment mode) in which the frequency of the display clock 58 is set within a range set in advance by the upper limit and lower limit frequencies corresponding to the tolerance phase range of the display phase discrepancy, and fine adjustment processing (processing in the steady state display mode) in which the frequency of the display clock 58 is set to an adjusted value such that the display phase discrepancy becomes small. By performing the coarse adjustment processing and the fine adjustment processing together, it is possible to adjust the phase of the display signal when reception starts, at high speed and with high accuracy.

(Third Embodiment)

Figure 17:
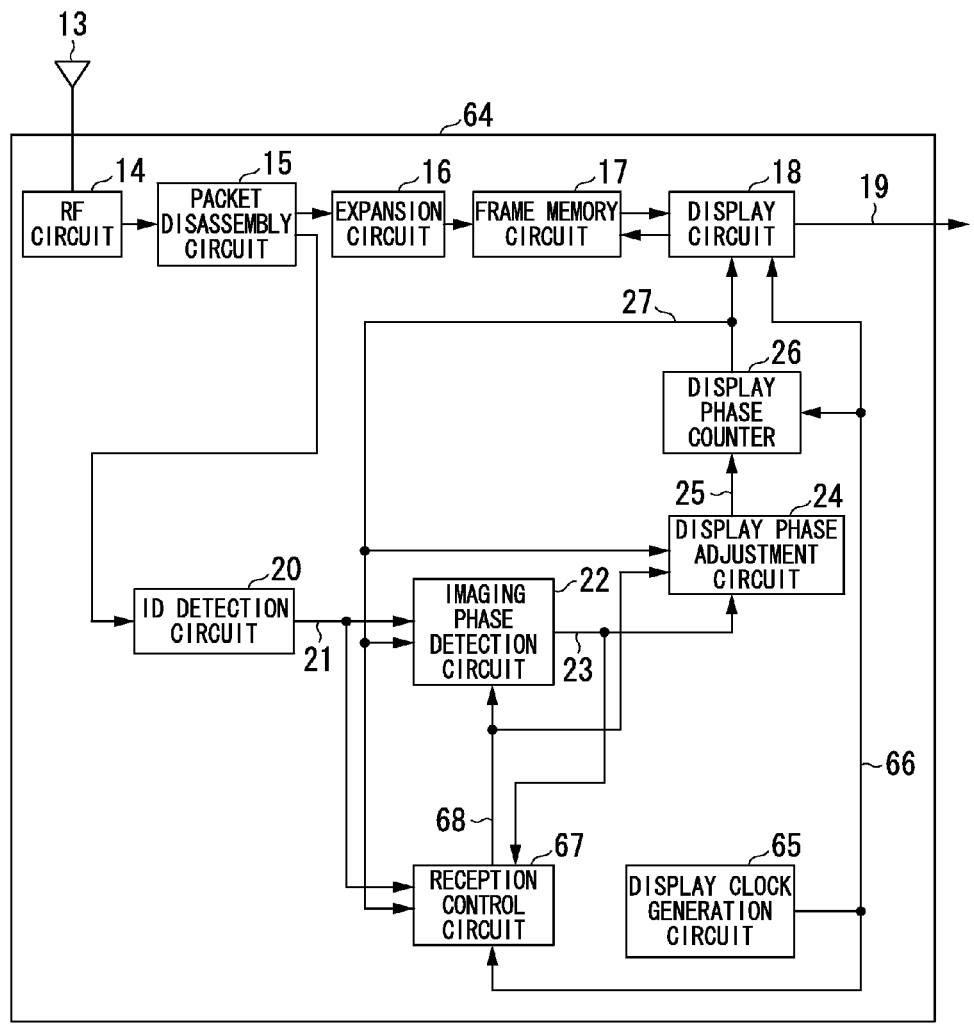
FIG. 17 is a block diagram showing the structure of a reception device according to a third embodiment of the present invention.
Figure 18:
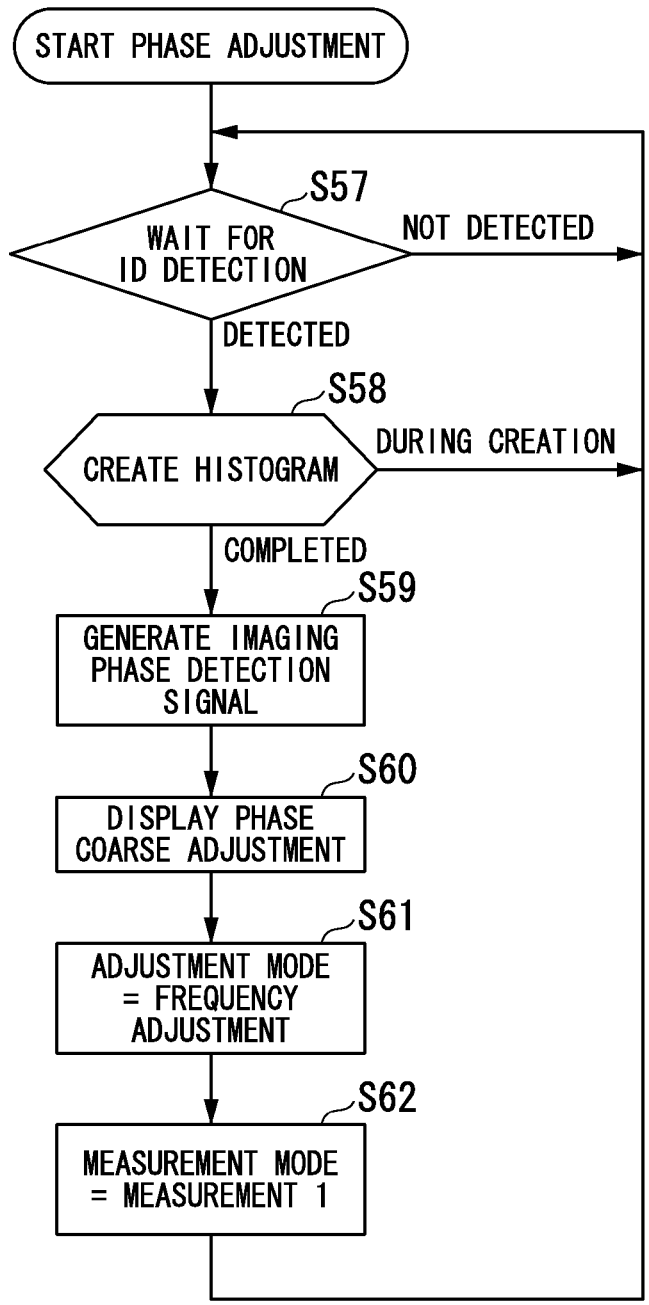
FIG. 18 is a flow chart showing the operation of the reception device according to the third embodiment of the present invention.
Figure 19:
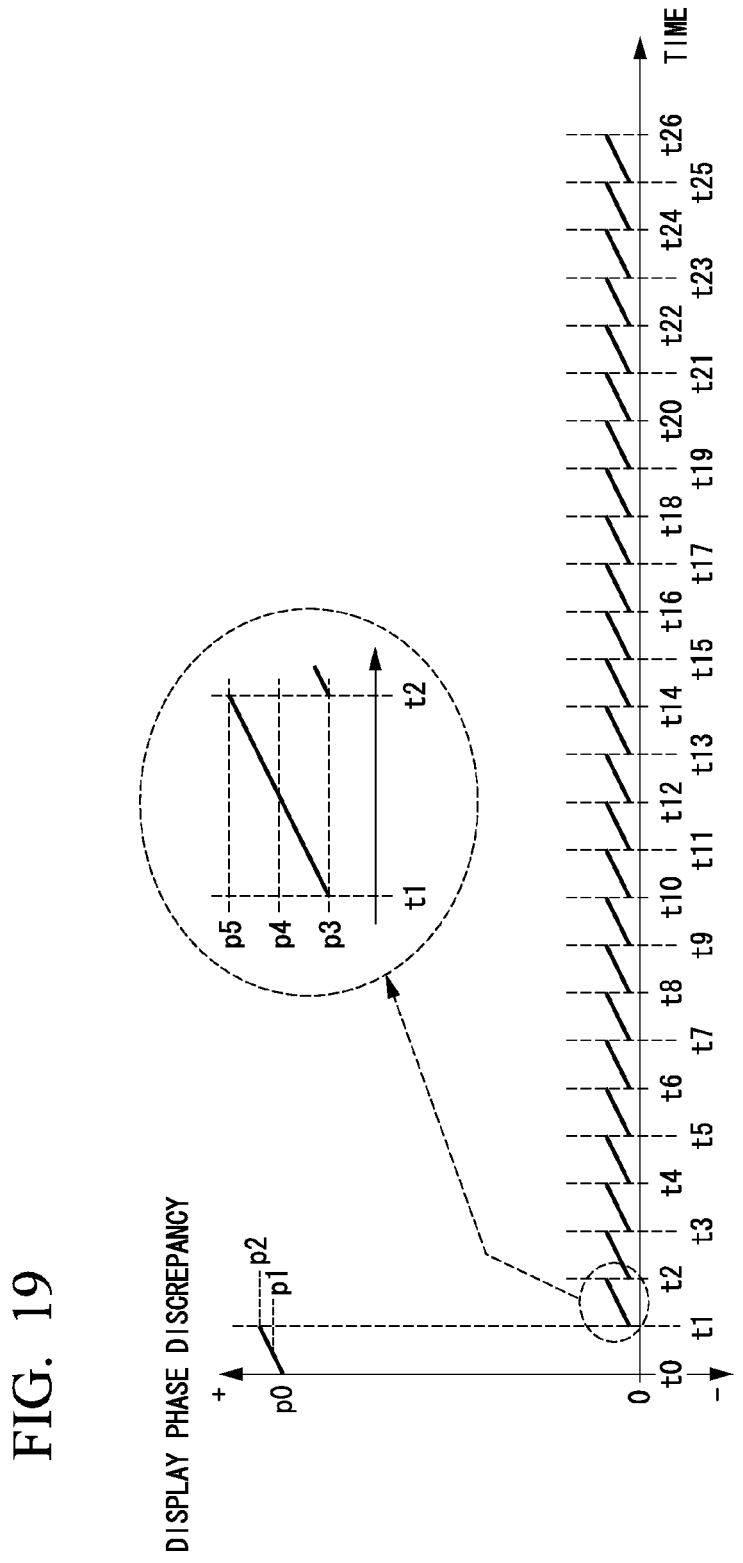
FIG. 19 is a schematic diagram showing the change in display phase discrepancy according to the third embodiment of the present invention.

Next is a description of a third embodiment of the present invention with reference to FIG. 17 to FIG. 19. The only operation mode in the present embodiment is the steady state display mode. In the steady state display mode of the present embodiment, the initial phase adjustment mode described in the first embodiment is performed repeatedly for phase adjustment.

FIG. 17 shows the structure of a reception device 64 according to the present embodiment. The construction of the reception device 64 is such that the display clock frequency adjustment circuit 28 is omitted from the reception device 12 of the first embodiment, and the display clock generation circuit is changed to a fixed frequency oscillation circuit. Therefore, the frequency of a display clock 66 is a fixed value. In FIG. 17, the same numbers are used for the circuits with the same functions as those in the reception device 12 shown in FIG. 1, and different numbers from those of the circuits of the reception device 12 shown in FIG. 1 are used for circuits that are central to the operation of the present embodiment.

The reception device 64 has an antenna 13, an RF circuit 14, a packet disassembly circuit 15, an expansion circuit 16, a frame memory circuit 17, a display circuit 18, an ID detection circuit 20, an imaging phase detection circuit 22, a display phase adjustment circuit 24, a display phase counter 26, a display clock generation circuit 65, and a reception control circuit 67. As described above, the display clock generation circuit 65 generates the display clock 66 at a fixed frequency. The reception control circuit 67 outputs a control signal 68 that controls the operation of each parts of the reception device 64.

Figure 20:
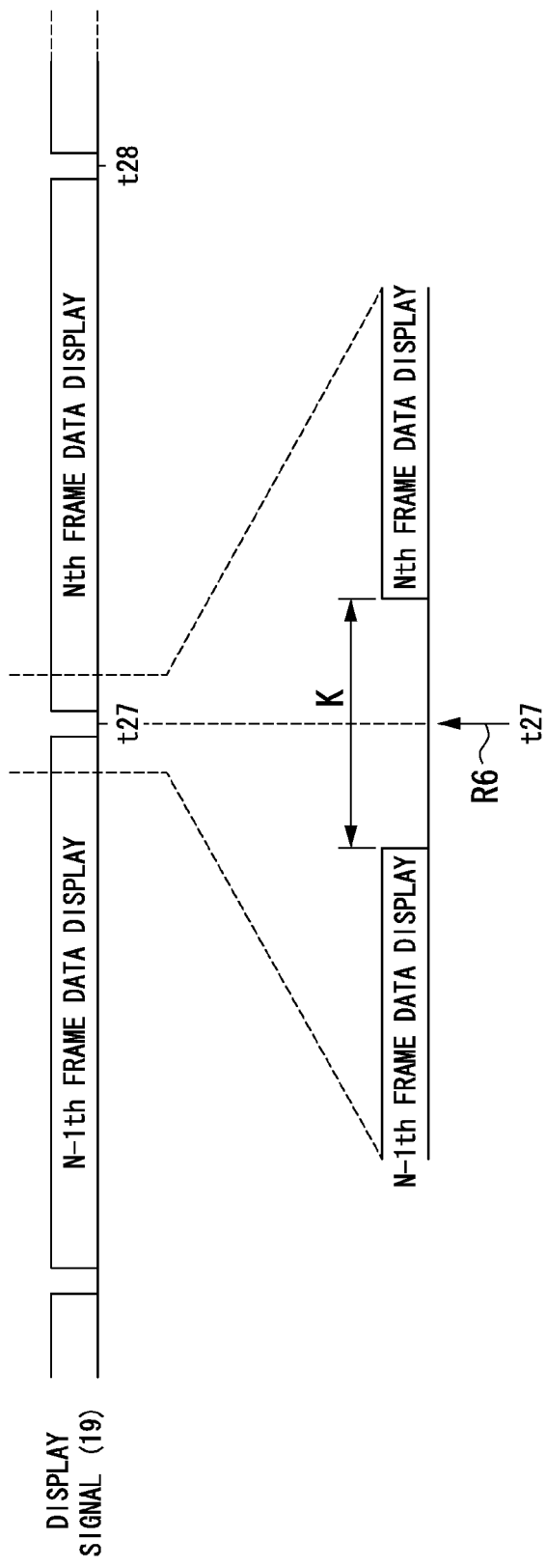
FIG. 20 is a timing chart to explain the reset timing of a display phase counter according to the third embodiment of the present invention.

Next is a description of the phase adjustment operation from the start of the operation in the reception device 64, with reference to FIG. 18 to FIG. 20. FIG. 18 shows the phase adjustment operation in the reception device 64. FIG. 19 is a schematic diagram showing an example of the change of the display phase discrepancy immediately after the operation starts. FIG. 20 shows reset operation timing of the display phase counter 26.

As shown in FIG. 18, the reception device 64 repeatedly performs the initial phase adjustment mode in the first embodiment. When the operation starts, the adjustment mode is the initial phase adjustment mode. The ID detection circuit 20 waits for the leading ID to be detected (S57), and the reception control circuit 67 checks whether a histogram is being created (being measured) or not after detecting the leading ID (S58). In the case where the measurements are completed, the imaging phase detection circuit 22 generates an imaging phase detection signal 23 according to the control signal 68 from the reception control circuit 67 (S59).

After generating the imaging phase detection signal 23, the display phase adjustment circuit 24 performs display phase adjustment according to the control signal 68 from the reception control circuit 67 (S60). Thereafter, the reception control circuit 67 sets the adjustment mode to the initial frequency adjustment mode (S61), and sets the measurement mode to measurement 1 (S62). Afterwards, the reception device 64 repeats the above-described processing.

In FIG. 19, the display phase discrepancy at the point in time when the first measurement starts is p0, and the display phase discrepancy at the point in time when the measurement is completed is p2. The difference between p0 and p2 is determined by the frequency difference between the imaging clock and the display clock. p1 is the value of the first measurement, and is the value of the addition of p0 and the difference (p2−p0)/2. Since in the phase adjustment, the phase of the display signal 19 is adjusted such that the measurement value (p1) is zero, even in the case where ideal adjustment is performed, at the point of time (time t1) that the next measurement starts, there is a display phase discrepancy of p2-p1. The display phase discrepancy p3 at the point in time when the measurement starts in the enlarged diagram (in the broken line circle) of FIG. 19 is equal to p2−p1. p4 is the value of the second measurement, and p5 is the display phase discrepancy when the measurement is terminated. In the case where the frequency difference is constant, the measurement interval is constant, so that the above-described relationship is maintained until the steady state display mode is terminated.

Next is a description of the relationship between the reset timing of the display phase counter 26 and the data display phase of the display signal 19 in the present embodiment. In FIG. 20, arrow R6 indicates the reset timing of the display phase counter 26. As shown in FIG. 20, the data display start position of the display signal 19 of the present embodiment is arranged such that it is in a position in which a prescribed time has elapsed since the display phase counter 26 is reset. This is because the reset of the display phase counter 26 is performed within the V blanking period K, which is a non-display period of the image data, so that no effect of the fluctuation of the reset timing appears in the display image.

As mentioned above, according to the present embodiment, in the reception device 64, the reception timing of specific packets is measured multiple times, the imaging frequency is estimated using the measurement results, and the phase of the display signal 19 is adjusted based on the estimated imaging frequency. By so doing, it is possible to perform display processing in synchronization with the operation of the imaging device 1 such that overflow or underflow does not occur, and furthermore it is possible to reduce the delay time of the display image. Moreover, since it is possible to adjust the phase of the display signal 19 by only the phase reset processing of the display signal 19, it is possible to limit an increase in hardware. Furthermore, by performing the reset processing within the blanking period, it is possible to prevent disturbance of the display image.

As above, the embodiments of the present invention are described in detail with reference to the drawings. However, specific constructions are not limited to the above-described embodiments, and any design change or the like that does not depart from the scope of the present invention is included.

What is claimed is:

1. A reception device comprising:
a reception unit which receives transmission data from an imaging device, the imaging device performing imaging processing at prescribed intervals, generating image data for each frame or field, packetizes the image data to create the transmission data, and performing transmission processing of transmitting the transmission data;
a display processing unit which performs display processing of generating a display signal for display from the transmission data;
a measurement unit which detects reception timing of a specific packet in each frame or field of the transmission data, measures a difference between prescribed reference timing periodically generated during a period of each frame or field in relation to display of the display signal and the reception timing of the specific packet that has been detected in each of a plurality of frames or fields, and generates an estimated imaging timing signal, which is used for estimating operation timing of the imaging processing, based on the measured difference; and
a processing unit which performs phase adjustment processing of synchronizing the imaging processing and the display processing so as to be a prescribed phase with each other using the estimated imaging timing.

2. The reception device according to claim 1, wherein the processing unit performs the phase adjustment processing such that display of the image data starts after a period during which the image data can be retransmitted in each frame or field.

3. The reception device according to claim 1,
wherein the specific packet includes an identification signal, and
the measuring unit measures a difference between the prescribed reference timing and only the detection timing of the specific packet which includes the identification signal.

4. The reception device according to claim 1, wherein the specific packet is a leading packet of each frame or field.

5. The reception device according to claim 1, wherein the phase adjustment processing includes a first process of changing a phase of the display signal momentarily, and a second process of changing the phase of the display signal continuously by adjusting a frequency of a display clock used to generate the display signal, and
the processing unit performs the second process only after the first process is performed.

6. The reception device according to claim 1,
wherein the phase adjustment processing includes a first process of setting a frequency of a display clock used to generate the display signal to a prescribed value including adjustment values corresponding to prescribed upper limit and lower limit frequencies, and a second process of setting the frequency of the display clock to an adjustment value such that a difference between a phase value of the display signal and the prescribed phase value becomes small, and
the processing unit performs the second process only after the first process is performed.

7. The reception device according to claim 1,
wherein the phase adjustment processing is a process of changing a phase of the display signal momentarily, and
the processing unit performs the phase adjustment processing within a blanking period being a non-display period of the image data.

8. The reception device according to claim 1, further comprising
a storage unit which stores a plurality of algorithms associated with the measurement,
wherein the measurement unit selects a prescribed algorithm from the plurality of algorithms stored in the storage unit according to the result of measurement, and generates the estimated imaging timing signal using the prescribed algorithm.

9. The reception device according to claim 1, wherein the measurement unit creates a histogram by measuring the difference the multiple times, and generates the estimated imaging timing signal based on the histogram.

10. The reception device according to claim 9, wherein the measurement unit generates the estimated imaging timing signal based on the histogram of divided sections equal to or exceeding a predetermined threshold among each divided section of the histogram, as a result of measuring the difference the multiple times.

* * * * *